United States Patent
Park et al.

(10) Patent No.: US 10,050,756 B2
(45) Date of Patent: Aug. 14, 2018

(54) METHOD FOR TRANCEIVING SIGNAL IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/122,629

(22) PCT Filed: Apr. 7, 2015

(86) PCT No.: PCT/KR2015/003459
§ 371 (c)(1),
(2) Date: Aug. 30, 2016

(87) PCT Pub. No.: WO2015/156573
PCT Pub. Date: Oct. 15, 2015

(65) Prior Publication Data
US 2017/0078062 A1 Mar. 16, 2017

Related U.S. Application Data

(60) Provisional application No. 61/977,605, filed on Apr. 9, 2014, provisional application No. 61/980,563, filed on Apr. 16, 2014.

(51) Int. Cl.
*G06F 11/00* (2006.01)
*H04L 1/16* (2006.01)
(Continued)

(52) U.S. Cl.
CPC ............. *H04L 5/0048* (2013.01); *H04B 7/26* (2013.01); *H04J 11/00* (2013.01); *H04W 24/10* (2013.01); *H04W 48/16* (2013.01); *H04W 56/001* (2013.01)

(58) Field of Classification Search
CPC .. H04L 5/0048; H04W 56/001; H04W 48/16; H04W 24/10; H04B 7/26; H04J 11/00
(Continued)

(56) References Cited

U.S. PATENT DOCUMENTS

2013/0279437 A1* 10/2013 Ng ........................ H04W 48/16
370/329
2014/0204825 A1* 7/2014 Ekpenyong ............. H04L 5/001
370/312

(Continued)

FOREIGN PATENT DOCUMENTS

WO 2013119073 8/2013

OTHER PUBLICATIONS

U.S. Appl. No. 61/955,585, filed Mar. 19, 2014.*
(Continued)

*Primary Examiner* — Chuong T Ho
(74) *Attorney, Agent, or Firm* — Lee, Hong, Degerman, Kang & Waimey

(57) ABSTRACT

According to an embodiment of the present invention, a terminal receives, from a base station, a discovery signal configuration comprising a first CSI-RS configuration, and takes RRM measurements of the discovery signal on based on the discovery signal configuration, wherein if the discovery signal corresponds to a first CSI-RS received on based on the first CSI-RS configuration, and if a first cell ID included in the first CSI-RS configuration corresponds to a cell-specific reference signal, the first CSI-RS and cell-specific reference signal are assumed to be quasi co-located
(Continued)

(QCL), and at least one from among the characteristics of the wireless channel, assumed to be QCL between the first CSI-RS for making RRM measurements and the cell-specific reference signal, is different from the characteristics of the wireless channel assumed to be QCL between a second CSI-RS for CSI measurements and the cell-specific reference signal.

14 Claims, 15 Drawing Sheets

(51) Int. Cl.
    *H04L 1/00* (2006.01)
    *H04L 12/26* (2006.01)
    *H04L 5/00* (2006.01)
    *H04B 7/26* (2006.01)
    *H04J 11/00* (2006.01)
    *H04W 24/10* (2009.01)
    *H04W 48/16* (2009.01)
    *H04W 56/00* (2009.01)

(58) Field of Classification Search
    USPC .................................. 370/329, 252, 253, 254
    See application file for complete search history.

(56) References Cited

U.S. PATENT DOCUMENTS

| | | | | |
|---|---|---|---|---|
| 2015/0092768 A1* | 4/2015 | Ng | ....................... | H04W 48/16 370/350 |
| 2015/0201369 A1* | 7/2015 | Ng | ....................... | H04W 48/16 370/254 |
| 2015/0208269 A1* | 7/2015 | Damnjanovic | ....... | H04L 1/0026 370/252 |
| 2015/0215929 A1* | 7/2015 | Damnjanovic | ......... | H04L 5/001 370/241 |
| 2015/0222399 A1* | 8/2015 | Cheng | ................... | H04L 5/0035 370/329 |
| 2015/0223149 A1* | 8/2015 | Liu | ....................... | H04W 48/12 370/252 |
| 2015/0264592 A1* | 9/2015 | Novlan | ............... | H04L 27/2601 370/252 |
| 2015/0271738 A1* | 9/2015 | Cheng | ................... | H04W 16/24 455/422.1 |
| 2015/0271744 A1* | 9/2015 | Liu | ........................ | H04L 5/005 370/329 |
| 2015/0349855 A1* | 12/2015 | Sesia | ..................... | H04B 7/024 370/252 |
| 2016/0013984 A1* | 1/2016 | Sun | ....................... | H04W 24/08 370/252 |

OTHER PUBLICATIONS

U.S. Appl. No. 61/968,911, filed Mar. 21, 2014.*
Huawei, "Network assistance for small cell discovery," 3GPP TSG-RAN WG1 #76, R1-141127, Apr. 2014, 4 pages.
LG Electronics, "Discussion on high-layer signaling for NAICS," 3GPP TSG-RAN WG1 #76, R1-141361, Apr. 2014, 7 pages.
MediaTek Inc., "On enhancements for small cell discovery and RRM measurements," 3GPP TSG-RAN WG1 #76, R1-141485, Apr. 2014, 6 pages.
Ericsson, "Design of Discovery Bursts and Procedures," 3GPP TSG-RAN WG1 #76, R1-141642, Apr. 2014, 8 pages.
PCT International Application No. PCT/KR2015/003459, Written Opinion of the International Searching Authority dated Jul. 16, 2015, 22 pages.

* cited by examiner

-- Prior Art --

FIG. 2
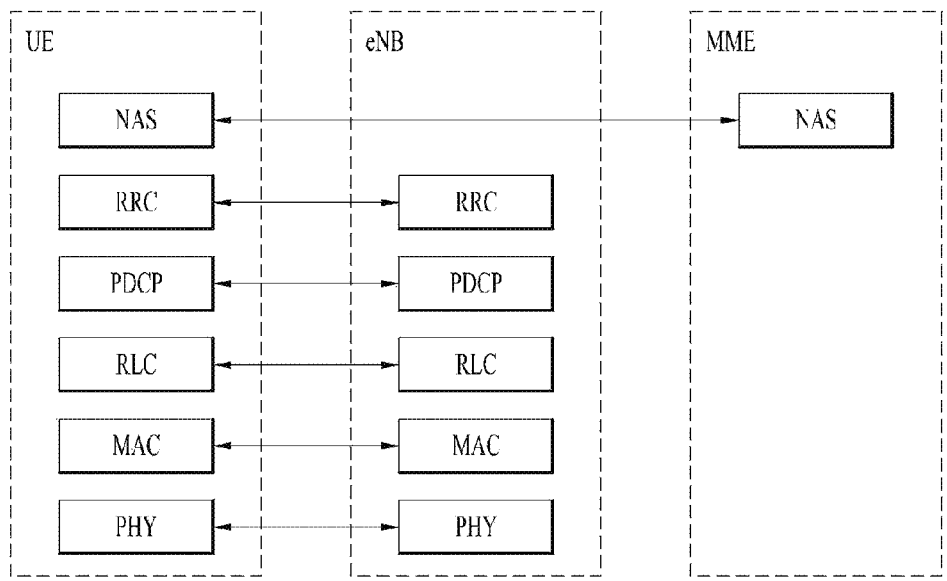
( a ) Control-Plane Protocol Stack
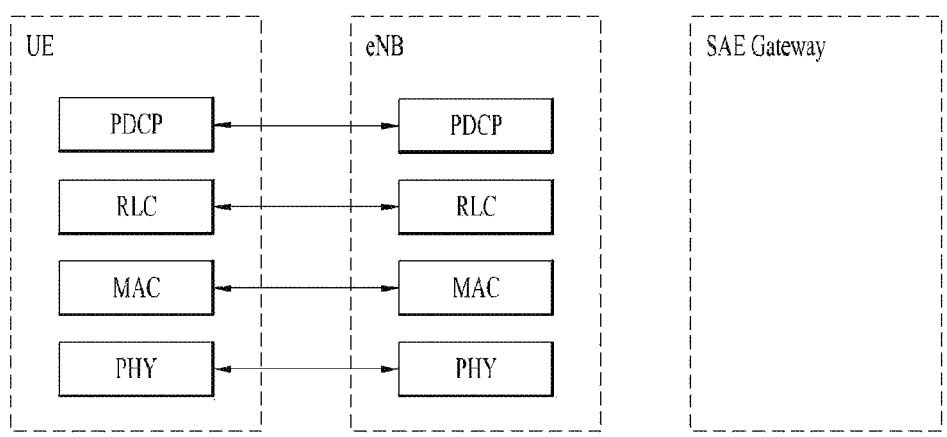
( b ) User-Plane Protocol Stack

▨ : DMRS GROUP 1

▨ : DMRS GROUP 2

FIG. 14

```
-- ASN1START

CSI-RS-ConfigNZP-r11 ::=   SEQUENCE {
    csi-RS-ConfigNZPId-r11         CSI-RS-ConfigNZPId-r11,
    antennaPortsCount-r11          ENUMERATED { an1, an2, an4, an8 },
    resourceConfig-r11             INTEGER ( 0 .. 31 ),
    subframeConfig-r11             INTEGER ( 0 .. 154 ),
    scramblingIdentity-r11         INTEGER ( 0 .. 503 ),
    qcl-CRS-Info-r11               SEQUENCE {
        qcl-ScramblingIdentity-r11     INTEGER ( 0 .. 503 ),
        crs-PortsCount-r11             ENUMERATED { n1, n2, n4, spare1 },
        mbsfn-SubframeConfigList-r11   CHOICE {
            release                        NULL,
            setup                          SEQUENCE {
                subframeConfigList             MBSFN-SubframeConfigList
            }
        }                                                                  OPTIONAL -- Need on
    }                                                                      OPTIONAL, -- Need OR
}

-- ASN1START
```

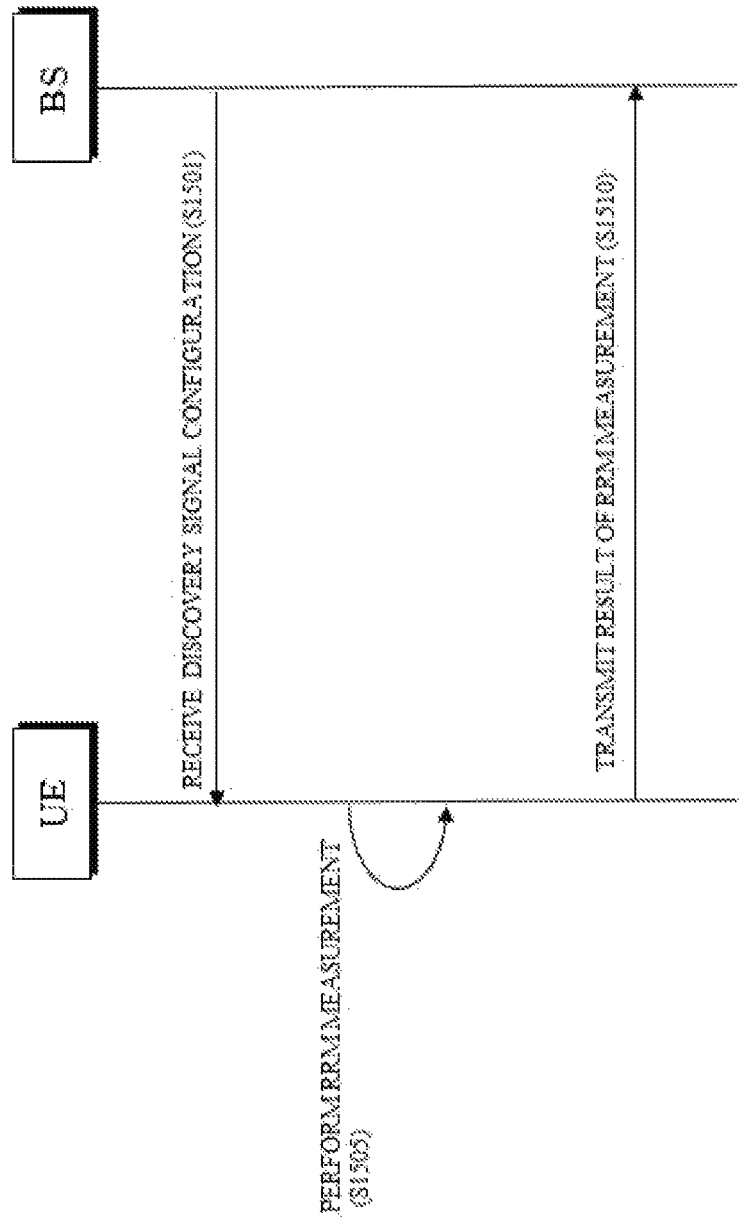

METHOD FOR TRANCEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/003459, filed on Apr. 7, 2015, which claims the benefit of U.S. Provisional Application No. 61/977,605, filed on Apr. 9, 2014, and 61/980,563, filed on Apr. 16, 2014, the contents of which are all hereby incorporated by reference herein in their entirety.

TECHNICAL FIELD

The present invention relates to a wireless communication system, and more particularly, to a method of transceiving a signal between a terminal and a base station in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, a method of transmitting and receiving a discovery signal in a wireless communication system and an apparatus therefor are proposed in the following.

A technical task of the present invention is not limited by the above-mentioned technical task. The technical task of the present invention can be induced from embodiments in which other technical tasks are disclosed.

Technical Solution

To achieve these and other advantages and in accordance with the purpose of the present invention, as embodied and broadly described, according to one embodiment, a method of receiving a discovery signal, which is received by a user equipment in a wireless communication system, includes receiving a discovery signal configuration containing a first channel state information-reference signal (CSI-RS) from a base station and performing radio resource management (RRM) measurement on the discovery signal based on the discovery signal configuration. In this case, if the discovery signal corresponds to a first CSI-RS, which is received based on the first CSI-RS configuration, and a first cell ID corresponds to a cell-specific reference signal, the first CSI-RS and the cell-specific reference signal are assumed to be quasi co-located (QCLed) and at least one of radio channel properties assumed to be QCLed between the first CSI-RS for the RRM measurement and the cell-specific reference signal is different from radio channel properties assumed to be QCLed between a second CSI-RS for CSI measurement and the cell-specific reference signal.

Preferably, the first CSI-RS and the cell-specific reference signal are assumed to be QCLed with respect to a time synchronization-related property and a frequency synchronization-related property and the second CSI-RS and the cell-specific reference signal are assumed to be QCLed with respect to the frequency synchronization-related property only.

Preferably, the first CSI-RS and the cell-specific reference signal are assumed to be QCLed with respect to large-scale properties of a radio channel containing average delay and Doppler shift and the second CSI-RS and the cell-specific reference signal are not assumed to be QCLed with respect to average delay.

Preferably, if a primary synchronization signal and a secondary synchronization signal correspond to the first cell ID, the primary synchronization signal and the secondary synchronization signal are assumed to be QCLed with the first CSI-RS and the primary synchronization signal and the secondary synchronization signal are not assumed to be QCLed with the second CSI-RS.

Preferably, the discovery signal includes at least one of the cell-specific reference signal, a primary synchronization signal, a secondary synchronization signal, and the first CSI-RS based on the first CSI-RS configuration and the first CSI-RS is assumed to be QCLed with the rest of signals except the first CSI-RS.

Preferably, the user equipment receives a second CSI-RS configuration for CSI measurement from the base station, receives the second CSI-RS based on the second CSI-RS configuration, reports CSI including at least one of a precoding matrix index (PMI), an rank indicator (RI), and a channel quality indicator (CQI) based on the second CSI-RS and transmits a result of the RRM measurement including reference signal received power (RSRP) information on the first CSI-RS to the base station. In this case, the first CSI-RS configuration included in the discovery signal configuration can be separately configured irrespective of the second CSI-RS configuration.

Preferably, a reception periodicity of the discovery signal for the RRM measurement is configured by 40 ms, 80 ms or 160 ms and a reception periodicity of the second CSI-RS can be configured by 5 ms, 10 ms, 20 ms, 40 ms or 80 ms.

Preferably, the first CSI-RS for the RRM measurement is not transmitted by zero power (non-zero power) and the second CSI-RS can be transmitted by zero power.

Preferably, the first CSI-RS is received from a neighboring cell or a neighboring transmission point and a result of the RRM measurement for the first CSI-RS can be transmitted to the base station.

Preferably, if the first CSI-RS and the second CSI-RS are received via an identical resource in an identical subframe, both the RRM measurement based on the first CSI-RS and the CSI measurement based on the second CSI-RS can be performed.

Preferably, if the first CSI-RS and the second CSI-RS are received via an identical resource in an identical subframe, the RRM measurement can be performed based on QCL assumption between the second CSI-RS and the cell-specific reference signal instead of QCL assumption between the first CSI-RS and the cell-specific reference signal.

Preferably, if the first CSI-RS and the second CSI-RS are received via an identical resource in an identical subframe, the first CSI-RS is assumed to be QCLed with the second CSI-RS. More preferably, the first CSI-RS and the second CSI-RS are assumed to be QCLed when the number of antenna ports of the first CSI-RS is equal to or less than the number of antenna ports of the second CSI-RS and a scrambling ID of the first CSI-RS and a scrambling ID of the second CSI-RS are identical to each other.

To further achieve these and other advantages and in accordance with the purpose of the present invention, according to a different embodiment, a user equipment receiving a discovery signal in a wireless communication system includes a receiver configured to receive a discovery signal configuration containing a first channel state information-reference signal (CSI-RS) from a base station and a processor configured to perform radio resource management (RRM) measurement on the discovery signal based on the discovery signal configuration. In this case, if the discovery signal corresponds to a first CSI-RS, which is received based on the first CSI-RS configuration, and a first cell ID corresponds to a cell-specific reference signal, the first CSI-RS and the cell-specific reference signal are assumed to be quasi co-located (QCLed) and at least one of radio channel properties assumed to be QCLed between the first CSI-RS for the RRM measurement and the cell-specific reference signal may be different from radio channel properties assumed to be QCLed between a second CSI-RS for CSI measurement and the cell-specific reference signal.

To further achieve these and other advantages and in accordance with the purpose of the present invention, according to a further different embodiment, a method of configuring a discovery signal, which is configured by a base station in a wireless communication system, includes transmitting a discovery signal configuration including a first channel state information-reference signal (CSI-RS) to a user equipment and receiving radio resource management (RRM) information on the discovery signal, which is measured based on the discovery signal configuration, from the user equipment. In this case, if the discovery signal corresponds to a first CSI-RS according to the first CSI-RS configuration and a first cell ID included in the first CSI-RS configuration corresponds to a cell-specific reference signal, the first CSI-RS and the cell-specific reference signal are assumed to be quasi co-located (QCLed) and at least one of radio channel properties assumed to be QCLed between the first CSI-RS for the RRM measurement and the cell-specific reference signal may be different from radio channel properties assumed to be QCLed between a second CSI-RS for CSI measurement and the cell-specific reference signal.

Advantageous Effects

According to embodiments of the present invention, it is able to efficiently transceive a reference signal between a terminal and a base station in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 14 is a diagram for an example of a FB-CSI-RS configuration;

FIG. 15 is a flowchart for a method of transmitting and receiving a discovery signal according to one embodiment of the present invention;

BEST MODE

Mode for Invention

Figure 1:
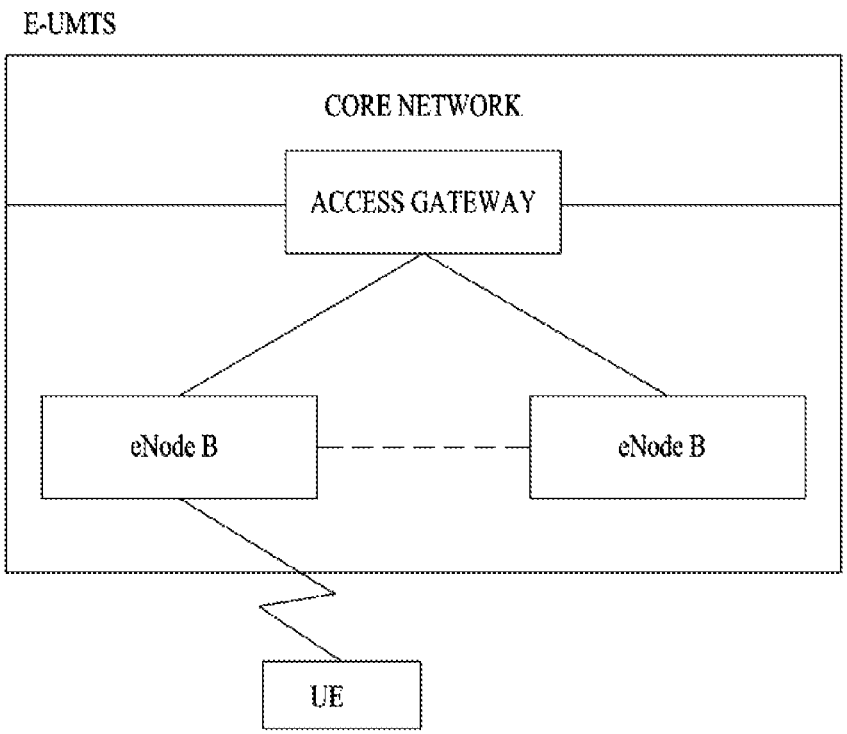
FIG. 1 is a schematic diagram of E-UMTS network structure as one example of a wireless communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, reconfiguration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
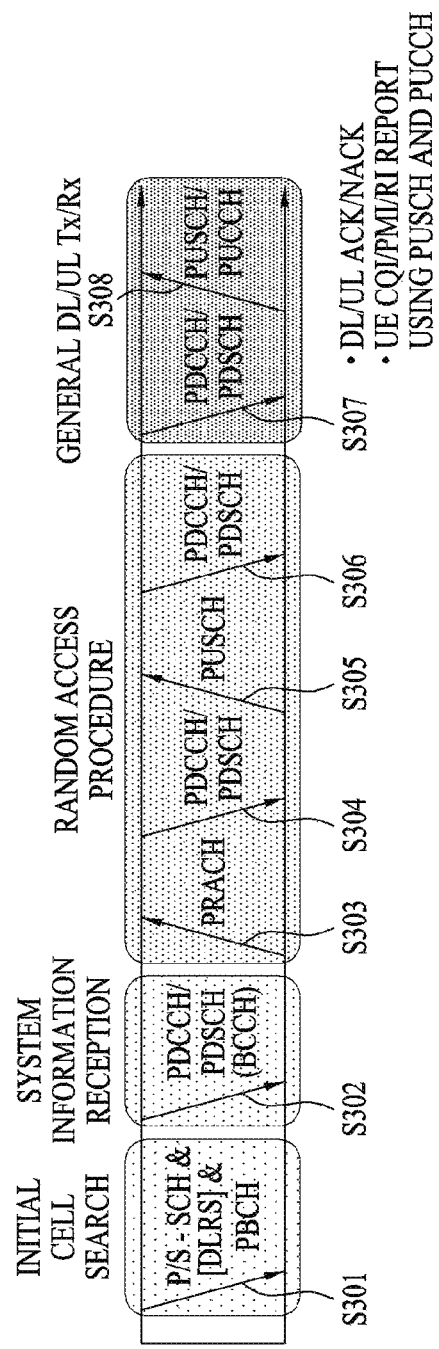
FIG. 3 is a diagram for explaining physical channels used for 3GPP system and a general signal transmission method using the physical channels.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
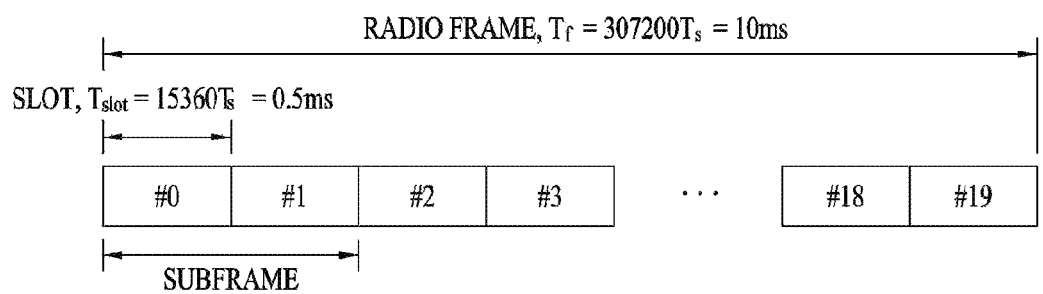
FIG. 4 is a diagram for a structure of a radio frame in LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360\ T_s$). In this case, $T_s$ denotes a sampling time represented by $T_s = 1/(15\ kHz \times 2048) = 3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
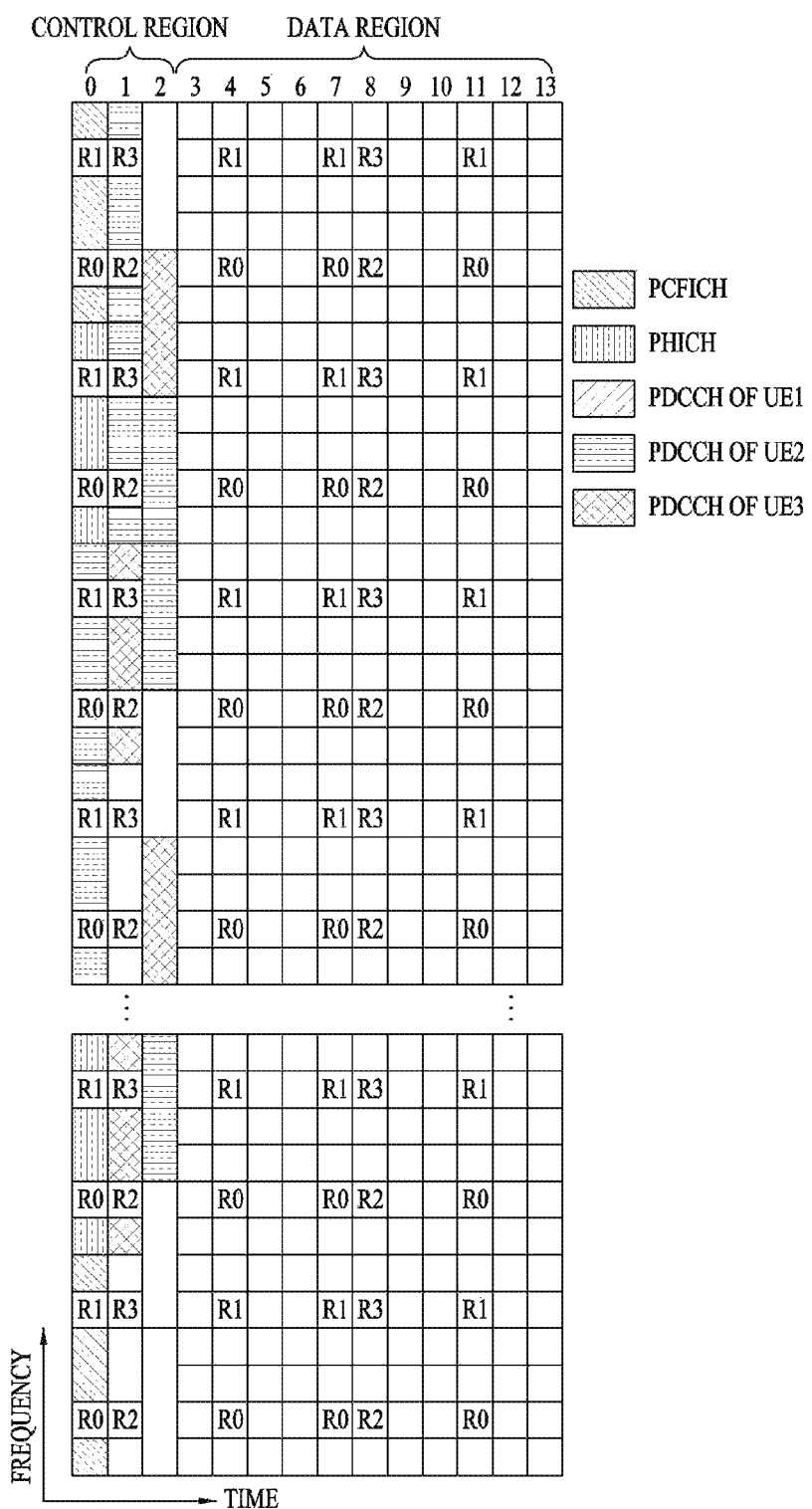
FIG. 5 is a diagram for a structure of a downlink radio frame in LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
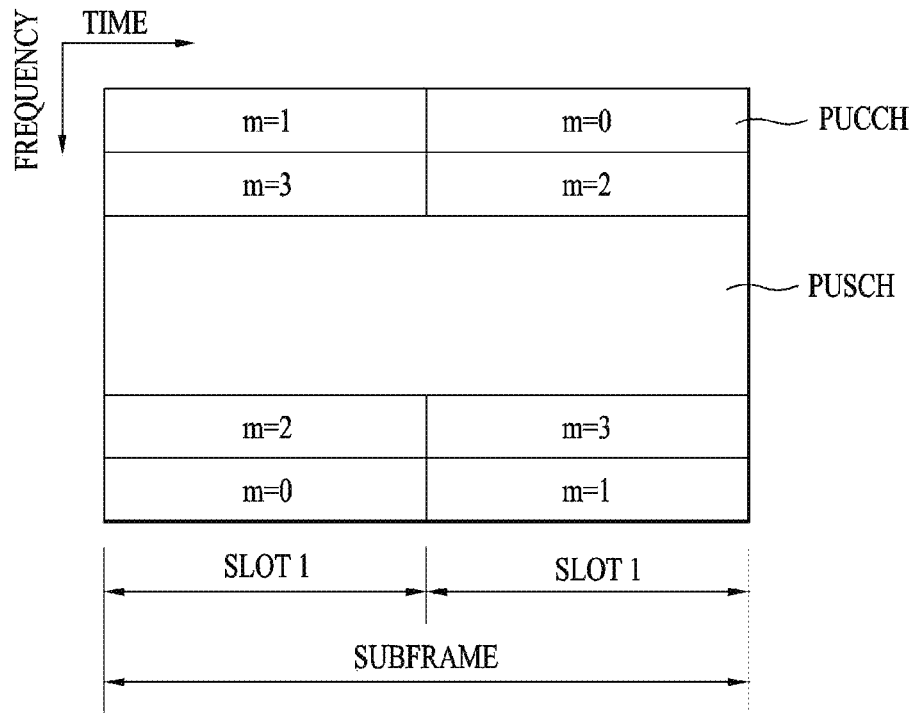
FIG. 6 is a diagram for a structure of an uplink subframe in LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
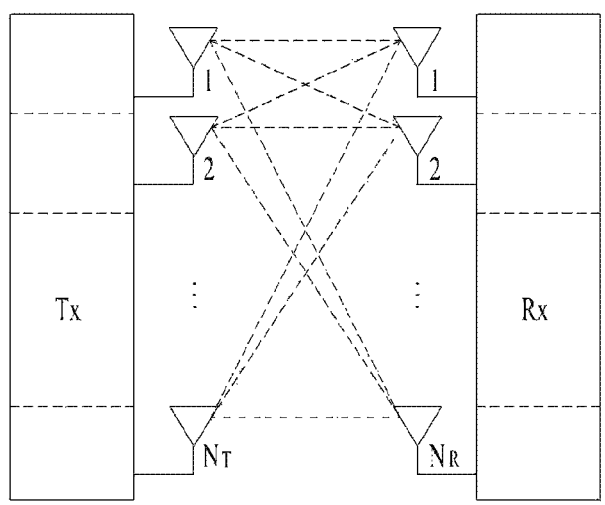
FIG. 7 is a diagram for a configuration of a multiple antenna (MIMO) communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multi-point (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
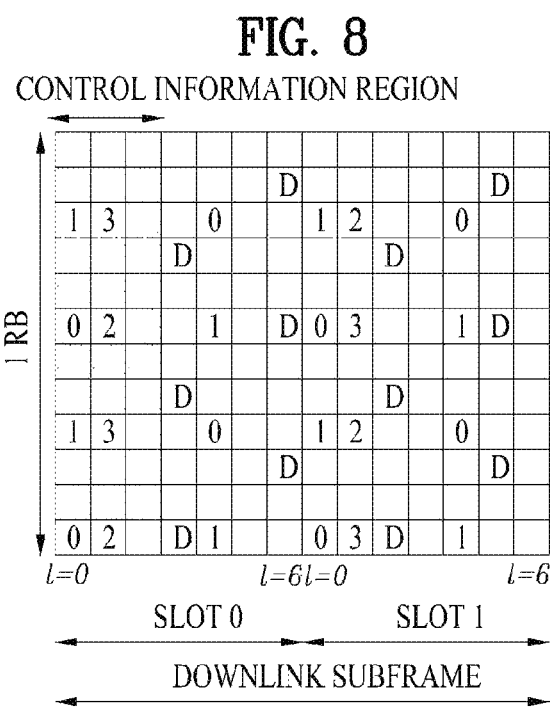
FIG. 8 and FIG. 9 are diagrams for a structure of a downlink reference signal in LTE system supportive of downlink transmission using 4 antennas.
Figure 9:
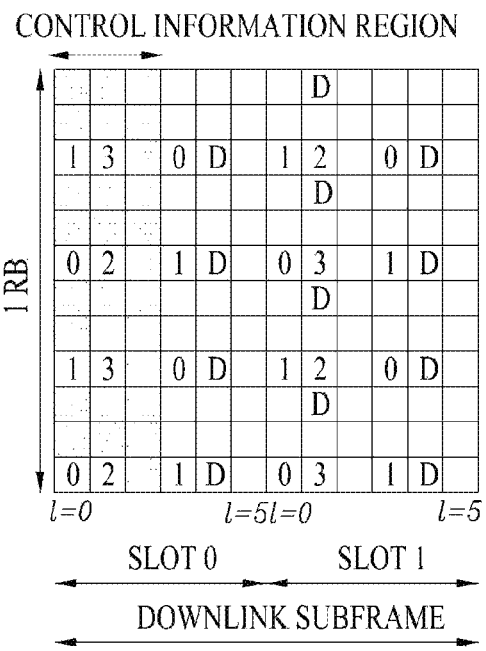

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
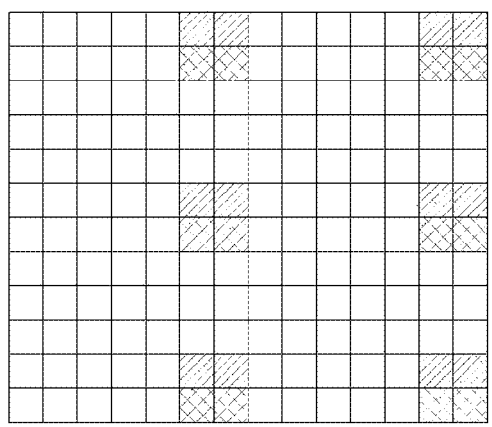
FIG. 10 is a diagram for an example of assigning a downlink DM-RS defined by a current 3GPP standard document.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |

TABLE 1-continued

|  | CSI reference signal configuration | Number of CSI reference signals configured ||||||
|---|---|---|---|---|---|---|---|
|  |  | 1 or 2 || 4 || 8 ||
|  |  | (k', l') | $n_s$ mod 2 | (k', l') | $n_s$ mod 2 | (k', l') | $n_s$ mod 2 |
| Frame structure type 2 only | 17 | (0, 2) | 1 |  |  |  |  |
|  | 18 | (3, 5) | 1 |  |  |  |  |
|  | 19 | (2, 5) | 1 |  |  |  |  |
|  | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 2

|  | CSI reference signal configuration | Number of CSI reference signals configured ||||||
|---|---|---|---|---|---|---|---|
|  |  | 1 or 2 || 4 || 8 ||
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

Figure 11:
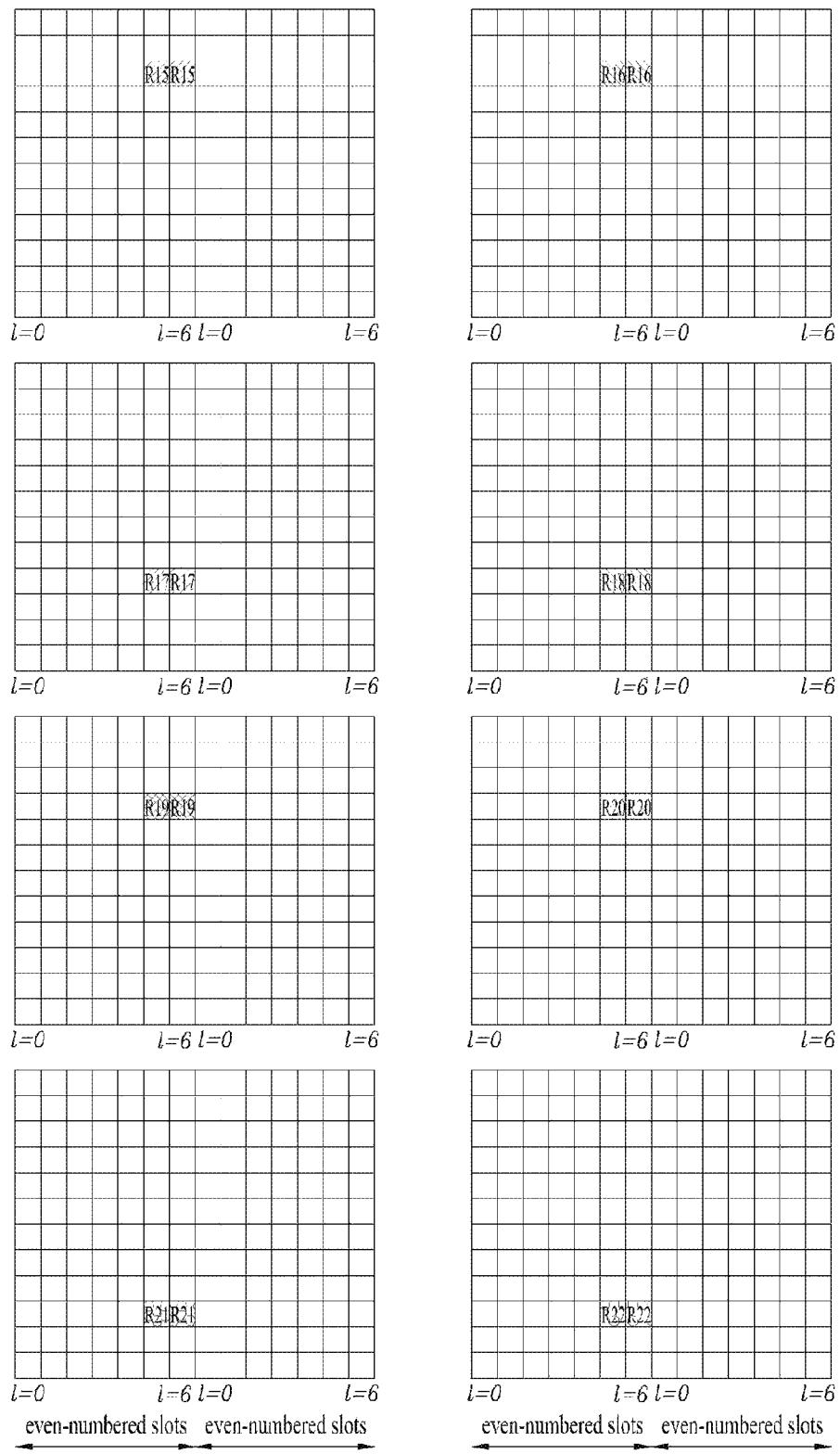
FIG. 11 is a diagram for an example of a CSI-RS configuration #0 in case of a normal CP among downlink CSI-RS configurations defined by a current 3GPP standard document.

In [Table 1] and [Table 2], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. A normal CSI-RS not the ZP CSI-RS will be referred to as a NZP (Non zero-power) CSI-RS.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

Hereinafter, the synchronization signals will be described.

The UE performs an initial cell search procedure such as acquisition of time and frequency synchronization with a cell and detection of physical layer cell identity $N^{cell}_{ID}$ of the cell when it desires to newly enter the cell or its power is turned on. To this end, the UE synchronizes with the eNB by receiving synchronization signals, for example, a primary synchronization signal (PSS) and a secondary synchronization signal (SSS) from the eNB, and acquires information such as cell ID, etc.

In more detail, a Zadoff-Chu (ZC) sequence of a length of 63 is defined in a frequency domain in accordance with the following Equation 8 and used as PSS d(n), whereby the PSS may acquire time domain synchronization and/or frequency domain synchronization such as OFDM symbol synchronization and slot synchronization.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Equation 8]}$$

In the above Equation 8, u indicates a ZC root sequence index, and is defined in the current LTE system as illustrated in Table 4 below.

TABLE 4

| $N_{ID}^{(2)}$ | Root index u |
|---|---|
| 0 | 25 |
| 1 | 29 |
| 2 | 34 |

Next, the SSS is used to acquire frame synchronization, cell group ID and/or CP configuration (that is usage information of normal CP or extended CP) of the cell, and is configured by interleaving combination of two binary sequences of a length of 31. That is, SSS sequences are d(0), . . . , d(61), and have a total length of 62. Also, the SSS sequences are defined differently from each other depending on whether the SSS sequences are transmitted in subframe #0 or subframe #5 as expressed by the following Equation 9. However, in the Equation 9, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 9]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In more detail, the synchronization signals are transmitted from the first slot of the subframe #0 and the first slot of the subframe #5 in consideration of a global system for mobile communication (GSM) frame length of 4.6 ms for facilitation of inter-radio access technology (inter-RAT) measurement. Especially, the PSS is transmitted from the last OFDM symbol of the first slot of the subframe #0 and from the last OFDM symbol of the first slot of the subframe #5, and the SSS is transmitted from the second to last OFDM symbol of the first slot of the subframe #0 and from the second to last OFDM symbol of the first slot of the subframe #5. A boundary of a corresponding radio frame may be detected through the SSS. The PSS is transmitted from the last OFDM symbol of a corresponding slot and the SSS is transmitted from an OFDM symbol immediately before the OFDM symbol from which the PSS is transmitted.

An SS may represent a total of 504 unique physical layer cell IDs through a combination of 3 PSSs and 168 SSSs. In other words, the physical layer cell IDs are grouped into 168 physical layer cell ID groups, each of which includes three unique IDs so that each physical layer cell ID is a part of only one physical layer cell ID group. Accordingly, a physical layer cell ID NcellID is uniquely defined by number N(1)ID in the range of 0 to 167 indicating a physical layer cell ID group and number N(2)ID from 0 to 2 indicating the physical layer ID in the physical layer cell ID group. The UE may be aware of one of three unique physical layer IDs by detecting the PSS, and may be aware of one of 168 physical layer cell IDs associated with the physical layer ID by detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID. Afterwards, the UE may receive intra-cell broadcast information managed by the eNB on a PBCH.

Meanwhile, in an environment that small cells are arranged densely, the UE may be connected to be overlapped with a macro cell and the small cells, and may perform data offloading. Under the circumstances, it is preferable that the UE distributively receives data and another information together with the macro cell by discovering one or more cells within a communication range. That is, an optimized cell for data offloading is not the optimized cell in view of RSRP (Reference Signal Received Power)/RSRQ (Reference Signal Received Quality). Preferably, a cell which has low load or is connected with many users may be an optimized cell for data offloading in view of entire cell management. The present invention suggests a procedure of transmitting a discovery reference signal (DRS) to detect more cells than a conventional cell detection method.

The DRS suggested in the present invention should (1) detect more cells than the legacy PSS/SSS/CRS based cell detection scheme, (2) detect and measure cells in a short time such as a subframe unit, and (3) support necessary measurement for fast time scale on/off operation. To this end, the present invention considers a structure of the DRS as candidates as follows:

[1] PSS/(SSS)+CRS;
[2] PSS/(SSS)+CSI-RS;
[3] PSS/(SSS)+PRS; and
[4] combination of one or more options of [1]-[3]

Additionally, it is expected that the DRS should be used for coarse time/frequency tracking, measurement of QCL (quasi co-location), etc., and should meet the following requirements.

1) The DRS should support coarse time synchronization with assumption of a very high initial timing error (error of about 2.5 ms).

2) The DRS should support coarse frequency synchronization with assumption of a very high initial frequency error (error of about 20 Khz)

3) The DRS should support the detectability of at least three cells or transmission points.

4) Finally, the DRS should support sufficient accuracy of measurement.

Hereinafter, to support the requirements of (1) and (2), it is assumed that PSS and/or SSS can be transmitted as the DRS.

Also, the periodicity of the DRS should be considered with the following constraints:

(a) multiple of measurement gap period: 40 msec, 80 msec, or 160 msec or 320 msec (if a new measurement gap period is defined, multiple of those new periods can be considered);

(b) alignment with DRX cycle: 10, 20, 32, 40, 64, 80, 128, 160, 256, 320, 512, 640, 1024, 1280, 2048, 2560 [subframe unit] (this constraint may not be considered if a UE uses legacy signals for the serving cell); and (c) if PSS/SSS are transmitted as the DRS, the periodicity of the DRS may be multiple of 5 msec so that PSS/SSS transmitted as the DRS can be replaced by PSS/SSS transmitted in on-state, that is, legacy PSS/SSS. If the PSS/SSS transmitted in on-state does not exist, this constraint may not be considered. Or to avoid impact on the legacy UE, PSS/SSS transmitted in on-state and PSS/SSS transmitted as the DRS may be transmitted with different periodicities not aligned with each other. That is, additional PSS/SSS can be transmitted as the DRS. If additional PSS/SSS are transmitted as the DRS, the additional PSS/SSS can be identified from the legacy PSS/SSS by cell ID.

Hereinafter, the present invention will be described based on PSS/(SSS)+CSI-RS of the DRS candidates of the above [1] to [4]. However, this is intended for convenience of description, and the present invention may similarly be extended to the other DRS candidates.

Figure 12:
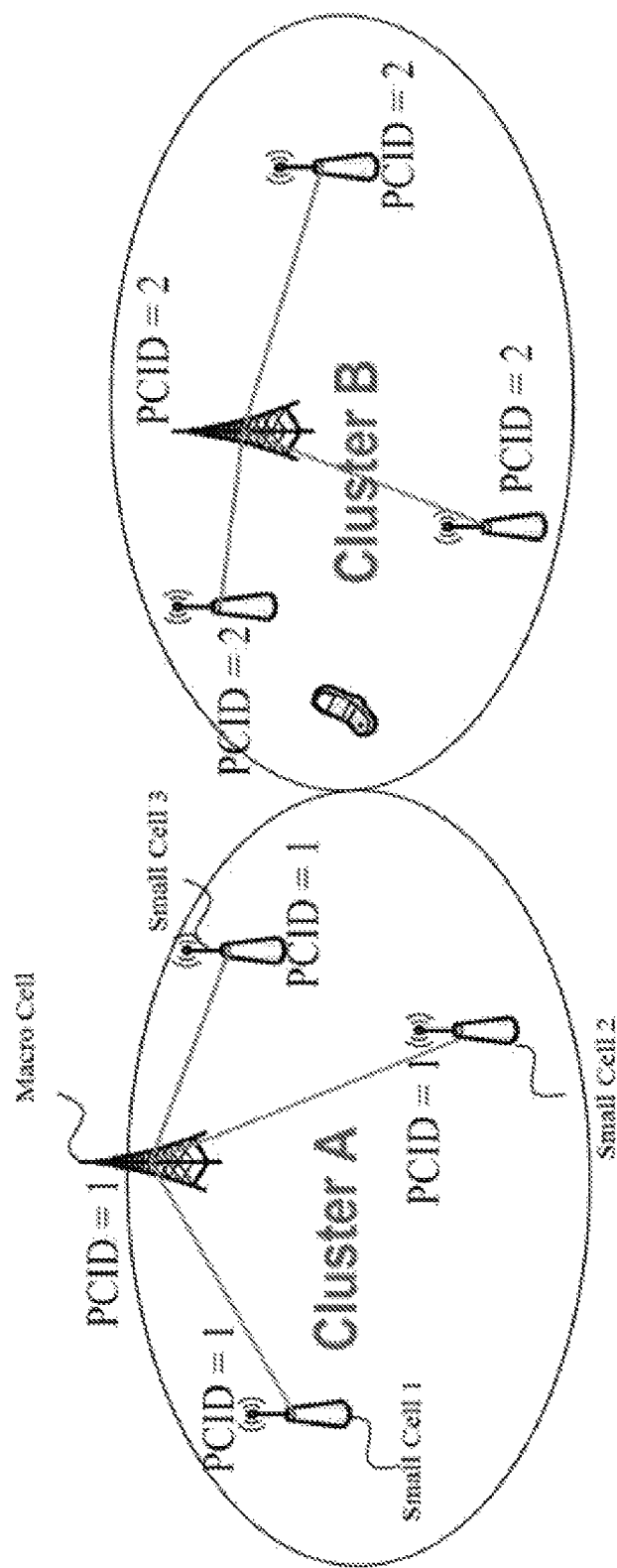
FIG. 12 is a diagram for wireless communication environment according to one embodiment of the present invention.

FIG. 12 is a diagram for wireless communication environment based on a shared cell ID scenario according to one embodiment of the present invention.

A shared cell ID scenario corresponds to environment in which a cell (e.g., a small-cell) cluster or a plurality of TPs (transmission points) belonging to a cell group operate based on an identical physical cell ID (PCID). In this case, a TP may correspond to a small cell or a macro cell, by which the present invention may be non-limited. For example, referring to FIG. 12, four TPs exist in a cluster A in which one macro cell and three small cells are included. The TPs belonging to the cluster A share a single PCID (e.g., 1) with each other. Meanwhile, TPs belonging to a cluster B share a single PCID (e.g., 2) with each other. It is not mandatory that a name of a PCID shared in a cluster is restricted to a physical cell ID. The name of the PCID can be indicated using a cluster ID or a group ID as well.

A PCID may correspond to a cell-specific ID used for generating and/or mapping a PSS/SSS and a CRS sequence in LTE technology. For example, TPs belonging to a cluster can share a cell-specific ID of a TP (e.g., a macro cell). According to a different embodiment, the PCID may correspond to an ID newly defined for the usage of sharing in a cluster.

For an additional cell-splitting gain among a plurality of TPs in a cluster, unique identification information can be provided to each of a plurality of the TPs. The unique identification information is referred to as a TPID. The TPID may correspond to a unique ID of each of a plurality of the TPS belonging to the cluster.

According to one embodiment, the TPID can be used as a sequence scrambling initialization parameter of a CSI-RS transmitted from a TP. Besides the CSI-RS, the TPID can also be used for generating and transmitting other TP-specific RSs.

In embodiments described in the following, it may be able to consider a situation that each TP transmits a unique TP-specific discovery reference signal (DRS). Since the DRS corresponds to a TP-specific reference signal used for measuring discovery of a cell, an RSRP of a cell, and the like, the DRS is different from a UE-specific RS for demodulating data (e.g., a DMRS (demodulation RS or a dedicated RS) or a UE-specific RS)).

In the following description, assume that a CSI-RS is used as a DRS transmitted by each TP, by which the present invention may be non-limited. It may be able to define and use a different TP-specific DRS. For example, as mentioned in the foregoing description, a PSS, an SSS, and/or a CRS can be used as a DRS. In other word, as mentioned in the foregoing description, the DRS can be configured by one or two or more combinations of the PSS, the SSS, the CRS and the CSI-RS.

Meanwhile, a legacy CSI-RS was used for the purpose of measuring CSI and performing CSI feedback in a manner that a terminal receives the CSI-RS. In particular, the terminal measures the CSI to acquire CSI feedback information including at least one of PMI, RI and CQI. Since the CSI feedback information is used for estimating a channel between a serving base station and a UE, the CSI feedback information is different from radio resource management (RRM) measurement for UE mobility. In order to perform the RRM measurement for UE mobility, CRS-based reference signal received power (RSRP), RSRQ (reference signal received quality), and RSSI (received signal strength indicator) measurement are used. Hence, in case of measuring the legacy CSI-RS, a UE measures at least one of CQI, RI and PMI rather than the RSRP or the RSRQ. According to one embodiment of the present invention, a CSI-RS can be used as a DRS. In this case, a terminal may measure RSRP, RSRQ, and/or RSSI of the CSI-RS.

Definition of FB-CSI-RS and DRS-CSI-RS

In order to clearly distinguish a legacy CSI-RS for measuring CSI and making a feedback on the CSI from a newly defined CSI-RS used as a DRS, the CSI-RS used for CSI feedback is referred to as a FB-CSI-RS (feedback-CSI-RS) and the CSI-RS used as a DRS is referred to as a DRS-CSI-RS. For example, the CSI-RS mentioned earlier in the paragraphs related to FIG. 10, FIG. 11, Table 1, Table 2, and Table 3 is referred to as the FB-CSI-RS in the following.

According to one embodiment of the present invention, a cell ID (physical cell ID—e.g., scrambling ID for CRS) can be used as a scrambling ID of a DRS-CSI-RS, by which the present invention may be non-limited. A cell ID for generating and mapping a CRS sequence and a scrambling ID for generating and mapping a DRS sequence can be signaled in a manner of being independent from each other. A shared cell ID scenario corresponds to a scenario capable of differently assigning a TP ID and a cell ID, by which the present invention may be non-limited.

Meanwhile, both a FB-CSI-RS and a DRS-CSI-RS can be set to a terminal. Hence, it is necessary to define a relationship between the FB-CSI-RS and the DRS-CSI-RS.

According to one embodiment of the present invention, a DRS-CSI-RS may correspond to a subset of a FB-CSI-RS. For example, if a resource, a pattern or the like in which the FB-CSI-RS is transmitted includes a resource or a pattern in which the DRS-CSI-RS is transmitted, the DRS-CSI-RS becomes a subset of the FB-CSI-RS. In this case, the FB-CSI-RS and the DRS-CSI-RS can be generated based on a single scrambling ID. For example, a TP transmitting both the FB-CSI-RS and the DRS-CSI-RS can generate the DRS-CSI-RS by reusing a scrambling ID, which was used for generating the FB-CSI-RS.

Meanwhile, each scrambling ID for two RSs can be respectively configured to a UE via higher measurement. For example, an SCID ID (scrambling ID)=1 is configured for the FB-CSI-RS and an SCID=2 can be configured for the DRS-CSI-RS. In this case, a resource and a pattern of a sequence (FB-CSI-RS) which are generated based on the SCID=1 may correspond to a superset of a resource and a pattern of a sequence (DRS-CSI-RS) which are generated based on the SCID=2.

Figure 13:
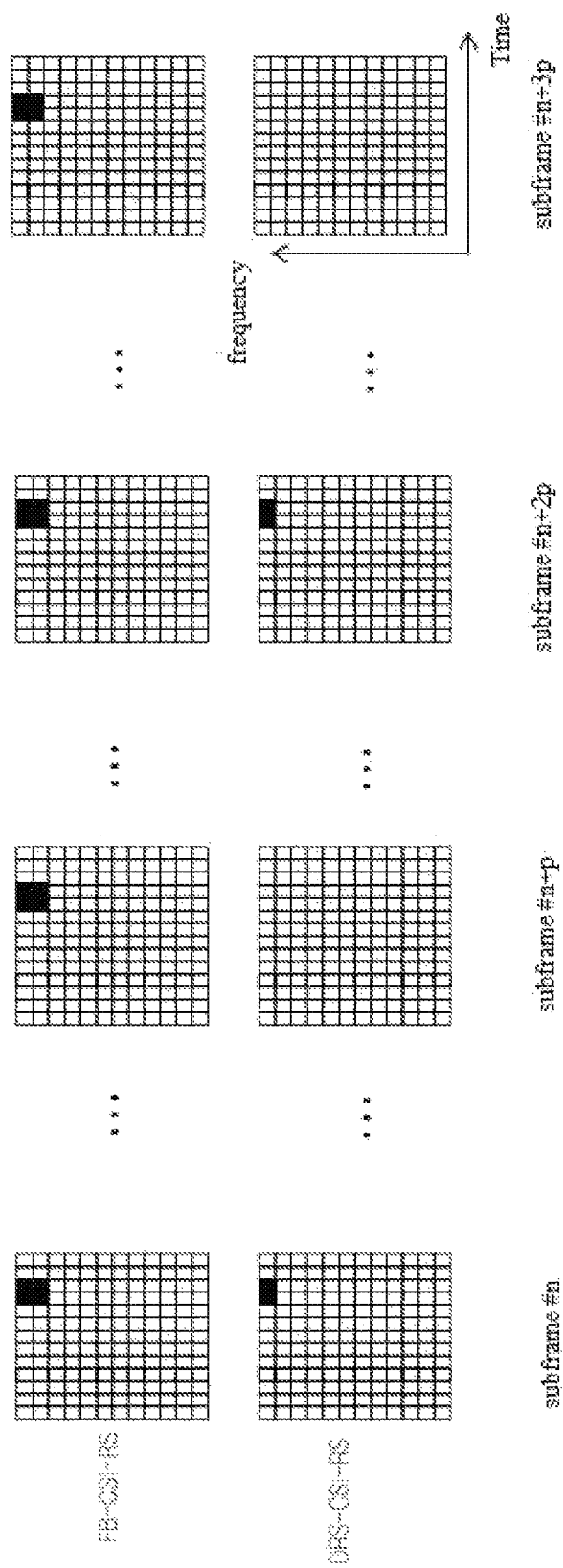
FIG. 13 is a diagram for CSI-RS signals according to one embodiment of the present invention.

FIG. 13 is a diagram for explaining a case that a FB-CSI-RS and a DRS-CSI-RS have a relationship of a superset and a subset.

As shown in FIG. 13, a resource and a pattern of a DRS-CSI-RS are included in a resource and a pattern of a FB-CSI-RS. Referring to FIG. 13, the FB-CSI-RS is periodically transmitted via 4 REs in total in every P subframes. Meanwhile, since a transmission period of the DRS-CSI-RS is longer than a transmission period of the FB-CSI-RS, the DRS-CSI-RS can be transmitted with a lower frequency. And, if the DRS-CSI-RS is transmitted using a part of antenna ports only used for transmitting the FB-CSI-RS, less number of REs can be used for transmitting the DRS-CSI-RS compared to REs used for transmitting the FB-CSI-RS.

In FIG. 13, although it is assumed that a single TP transmits both the FB-CSI-RS and the DRS-CSI-RS, by which the present invention may be non-limited. For example, the FB-CSI-RS and the DRS-CSI-RS can be received from TPs different from each other. A UE may receive the FB-CSI-RS from a TP 1 and receives the DRS-CSI-RS from a TP 2. In this case, the FB-CSI-RS received from the TP 1 does not correspond to a superset of the DRS-CSI-RS received from the TP 2. The DRS-CSI-RS received from the TP 2 may have a subset relationship with a FB-CSI-RS transmitted by the TP 2. If a serving cell of the UE corresponds to the TP 1 and the TP 2 corresponds to a neighboring cell, the UE receives the FB-CSI-RS from the serving cell and receives the DRS-CSI-RS from the neighboring cell. Yet, in this case, both a configuration of the FB-CSI-RS and a configuration of the DRS-CSI-RS can be received from the TP 1. In particular, the UE provides the configuration of the FB-CSI-RS of the TP 1 and the configuration of the DRS-CSI-RS of the TP 2 to the UE. By doing so, a plurality of CSI-RS configurations can be provided to the UE. The UE reports CSI to the TP 1 in response to the configuration of the FB-CSI-RS and reports radio resource management (RRM) measurement (e.g., RSRP/RSRQ/RSSI) to the TP 1 in response to the configuration of the DRS-CSI-RS.

According to the aforementioned embodiments, since it may affect a legacy scheme of configuring a FB-CSI-RS, methods capable of inducing a relationship between a FB-CSI-RS configuration and a DRS-CSI-RS configuration by a UE are proposed although the CSI-RS configuration and the DRS-CSI-RS configuration separately exist.

A DRS is transmitted with a relatively long period (e.g., 40 ms, 80 ms, 160 ms, . . . ) not only in a state that a cell is turned on but also in a state that the cell is turned off. Hence, a UE can use the DRS to detect the cell irrespective of On/Off of the cell and measure RRM. As mentioned in the foregoing description, a DRS-CSI-RS for a specific TP and a FB-CSI-RS for the specific TP can be set to the UE, respectively.

FIG. 14 is a diagram for an example of a FB-CSI-RS configuration signaled to a UE via an RRC layer.

Referring to FIG. 14, a FB-CSI-RS can be configured via a specific period (e.g., 5 ms), a subframe offset, number of antenna ports, a frequency/time resource, and a scrambling ID (e.g., virtual cell-ID, VCID). QCLed CRS information can be provided to the FB-CSI-RS as well. Meanwhile, since QCL assumption with the FB-CSI-RS is available by a CRS only, it is difficult to assume that a PSS and an SSS are QCLed with the FB-CSI-RS. Large-scale properties capable of performing QCL assumption between the FB-CSI-RS and the CRS can include Doppler shift and Doppler spread only. Hence, such a property as average delay and the like is incapable of performing QCL assumption between the FB-CSI-RS and the CRS.

As mentioned in the foregoing description, the DRS-CSI RS configuration can be set to a UE irrespective of the FB-CSI-RS configuration. For example, the DRS-CSI-RS configuration can include at least one of a period (e.g., 160 ms) of a DRS-CSI-RS, number of antenna ports, a resource, a scrambling ID (e.g., virtual cell-ID or a tPID), and QCLed RS information (e.g., QCLed PSS, SSS, CRS and/or FB-CSI-RS). In particular, unlike the FB-CSI-RS, it is able to assume that the DRS-CSI-RS is QCLed with a PSS and/or an SSS. QCLed large scale properties can include average delay as well as Doppler shift.

FB-CSI-RS Configuration and DRS-CSI-RS Configuration

Meanwhile, according to a different embodiment, there may exist an association relationship between a FB-CSI-RS and a DRS-CSI-RS. For example, if a first parameter of a DRS-CSI-RS configuration is associated with a second parameter of a FB-CSI-RS configuration, it may be able to obtain the second parameter using the first parameter or obtain the first parameter using the second parameter.

When it is assumed that the FB-CSI-RS is different from the DRS-CSI-RS, if there is a case that the two RSs are mapped to an identical RE, it is necessary to have a method of processing the case. In order to prevent the two RSs from being collided with each other, it may be able to design to avoid overlap itself of the two RSs. Yet, it may be difficult to avoid the overlap due to such a situation as restriction of a time-frequency resource and the like. For example, in case of TDD, there exist a plurality of UL/DL configurations. In this case, a ratio of DL subframes is considerably low in a part of a plurality of the UL/DL configurations (e.g., UL/DL configuration #0). In this case, the number of DL subframes capable of transmitting a CSI-RS is very limitative and it is difficult to differently configure a DL subframe in which a FB-CSI-RS is transmitted and a DL subframe in which a DRS-CSI-RS is transmitted.

If the FB-CSI-RS and the DRS-CSI-RS are configured to be overlapped with each other, it is more preferable in the aspect of reducing network overhead and supporting a legacy UE. Moreover, in order to support muting of CSI-RS resources between TPs, it is necessary to configure a ZP-CSI-RS including not only the FB-CSI-RS but also the DRS-CSI-RS. In particular, when a UE measures the ZP-CSI-RS, it is necessary to transmit not only the FB-CSI-RS but also the DRS-CSI-RS with zero power. To this end, a subframe in which the FB-CSI-RS is transmitted and a subframe in which the DRS-CSI-RS is transmitted are configured to have a different period/offset under minimum 5 ms grid alignment.

As mentioned in the foregoing description, since there exists a case that the FB-CSI-RS and the DRS-CSI-RS are overlapped with each other, it is necessary to define operations of a UE and a base station to handle the case.

Meanwhile, in order to easily implement a UE, it may be able to define a DRS-CSI-RS configuration and a FB-CSI-RS configuration to have a common part. For example, there may exist such a constraint as "DRS-CSI-RS and FB-CSI-RS should be included in a ZP-CSI-RS configuration". Yet, although there is no constraint in a configuration, the FB-CSI-RS and the DRS-CSI-RS can be transmitted in an identical resource at the same time. In order to make a UE process the RSs transmitted in the identical resource at the same time, the FB-CSI-RS and the DRS-CSI-RS can be generated and transmitted via a single scrambling ID and power. In particular, when the FB-CSI-RS and the DRS-CSI-RS are overlapped with each other, it may be able to configure the FB-CSI-RS and the DRS-CSI-RS to have an identical sequence and an identical mapping pattern.

On the contrary, when a scrambling ID of a FB-CSI-RS and a scrambling ID of a DRS-CSI-RS are different from each other, if it is necessary to transmit the FB-CSI-RS and the DRS-CSI-RS in an identical resource, the FB-CSI-RS and the DRS-CSI-RS should be multiplexed (CDM (code division multiplexing)) via an orthogonal covering code. In this case, it may be able to apply an assumption that an antenna port transmitting the FB-CSI-RS and an antenna port transmitting the DRS-CSI-RS are QCLed.

According to one embodiment of the present invention, at least one of parameters of the DRS-CSI-RS configuration may have a value identical to that of parameters of the FB-CSI-RS configuration.

A parameter common to the DRS-CSI-RS and the FB-CSI-RS can include at least one among parameters described in the following.

1) A physical cell ID: A physical cell ID of a DRS-CSI-RS may correspond to a scrambling ID or a cell ID detected by a PSS/SSS. In case of a QCL type A, a physical cell ID of a FB-CSI-RS may correspond to a physical cell ID of a serving cell. In case of a QCL type B, a physical cell ID of a FB-CSI-RS may correspond to a scrambling ID/physical cell ID of a QCLed CRS.

2) Number of RS ports (antennaPortCount)

3) Freq/time resource location information (resourceConfig)

4) Period and subframe offset information (subframeConfig)

5) Sequence scrambling initialization parameter (scramblingIdentity)

6) (QCLed RS-related information and QCL property category) (e.g., at least one of delay spread, Doppler spread, Doppler shift, average gain, and average delay) (qcl-RS-info)

For example, 2), 3), and 5) among the aforementioned parameters can make a specific FB-CSI-RS and a DRS-CSI-RS have common configuration information. 5) may correspond to a VCID or a TPID (for clarity, it is assumed that 5) is referred to as 'TPID' and the TPID can be explained in a manner of being mixed with 'VCID' in the context). If scrambling ID information is identically configured, it may indicate that a FB-CSI-RS sequence and a DRS-CSI-RS sequence are identically generated. 2) and 3) indicate that a FB-CSI-RS sequence and a DRS-CSI-RS sequence are mapped to an identical time-frequency resource.

4) RS transmission period and/or subframe offset information may be different in FB-CSI-RS configuration and DRS-CSI-RS configuration. For example, a FB-CSI-RS is configured to have a first period (e.g., 5 ms) and a first subframe offset whereas a DRS-CSI-RS can be configured to have a second period (e.g., 160 ms) and a second subframe offset. The second period is configured by a value greater than the first period. It is preferable to configure the second period by a multiple of the first period.

A UE receives CSI-RSs which are generated and transmitted via an identical scrambling ID, a resource of an identical location in a subframe and/or an identical number of antenna ports. The UE performs cell detection/identification and/or RRM measurement report (e.g., RSRP, RSRQ) using a CSI-RS which is received in a subframe (e.g., a subframe according to a period of 160 ms) indicated by the DRS-CSI-RS configuration. The UE performs CSI measurement using CSI-RSs, which are received in subframes except the subframe according to the period of 160 ms indicated by the DRS-CSI-RS configuration, i.e., the subframes (e.g., a subframe according to a period of 5 ms) indicated by the FB-CSI-RS configuration and makes a feedback on CSI. Meanwhile, the CSI measurement can be performed according to configuration information of at least one or more CSI-processes to which the CSI-RS belongs thereto.

If a subframe indicated by a period (e.g., 160 ms) according to the DRS-CSI-RS configuration and a subframe indicated by a period (e.g., 5 ms) according to the FB-CSI-RS configuration are identical to each other, the UE can perform all operations necessary for the DRS-CSI-RS and the FB-CSI-RS. In particular, the UE can perform the cell detection, the RRM measurement report, and the CSI measurement.

QCL in DRS-CSI-RS Configuration

QCLed target signal and QCLed large-scale properties may be different from each other in DRS-CSI-RS configuration information and FB-CSI-RS configuration information. For example, in case of a FB-CSI-RS, a UE RRC configured by a QCL type B can apply QCL assumption to QCLed CRS, Doller shift, and Doppler spread only based on CRS information (qcl-ScramblingIdentity-r11 value corresponding to a PCID of the QCLed CRS, crs-PortsCount-r11 corresponding to the number of ports of the QCLed CRS, mbsfn-SubframeConfigList-r11 indicating a location of the QCLed CRS in an MBSFN subframe) indicated by the FB-CSI-RS configuration. The UE can also apply a fine frequency synchronization result of the QCLed CRS/information to the CSI-RS to perform more accurate frequency synchronization.

QCL Target Signal of DRS-CSI-RS

Meanwhile, QCLed information of a DRS-CSI-RS can be differently and independently defined or configured irrespective of a FB-CSI-RS. For example, a QCLed target signal can be indicated by at least one of a PSS, an SSS, a CRS, and a FB-CSI-RS. In this case, the FB-CSI-RS can be defined by an optional presence form. As a scheme of providing QCL information of the optional FB-CSI-RS, it may be able to implicitly define that QCL assumption on a TPID is available between a DRS-CSI-RS and a FB-CSI-RS identical to each other. Or, it may be able to explicitly indicate and configure a FB-CSI-RS on which the QCL assumption is available. There may exist one or more QCLed FB-CSI-RSs. It may be able to signal a list of FB-CSI-RS IDs or a list of VCIDs included in a FB-CSI-RS configuration.

As one embodiment that a QCLed FB-CSI-RS optionally exists, a FB-CSI-RS can also be transmitted in OFF state of a cell for fast cell ON/OFF transition. If a FB-CSI-RS configuration, which transmits a FB-CSI-RS all the time irrespective of ON/OFF of a cell, is set to a UE, it may be able to utilize large-scale properties of a wireless channel, which are obtained via a FB-CSI-RS transmitted with higher frequency via a period shorter than a DRS-CSI-RS, for a DRS-CSI-RS as well.

Meanwhile, besides the scheme of assuming that the FB-CSI-RS and the DRS-CSI-RS are QCLed, it may be able to make a UE recognize the FB-CSI-RS and the DRS-CSI-RS as a completely same signal transmitted from RE positions overlapped with each other and/or a signal transmitted via antenna ports overlapped with each other.

According to one embodiment of the present invention, a signal capable of being QCLed with a DRS-CSI-RS can be restricted to a specific PSS/SSS/CRS. The specific PSS/SSS/CRS of which QCL assumption is available can be defined as follows. A DRS-CSI-RS configuration signaled to a UE by a base station via RRC can include information on a TPID. The TPID included in the DRS-CSI-RS configuration may correspond to PCID information of a PSS/SSS/CRS capable of being QCLed by the UE. For example, when the UE obtains a PCID by detecting a PSS/SSS/CRS, if the PCID is matched with a TPID provided via the DRS-CSI-RS configuration, it can be implicitly defined as QCL assumption is established between a DRS-CSI-RS and the PSS/SSS/CRS.

According to a different embodiment, interworking information of a PCID set of a signal, which is capable of being QCLed according to a TPID indicated by a DRS-CSI-RS configuration, can be set to a UE in advance via RRC. If a PCID detected by the UE via a PSS/SSS/CRS belongs to the interworking information of the PCID set, it may be able to explicitly define and configure that QCL assumption between the PSS/SSS/CRS and a DRS-CSI-RS is applicable.

Large-Scale Properties for QCL Assumption of DRS-CSI-RS

A large-scale property value of a wireless channel of which QCL assumption is available may also be different in a DRS-CSI-RS configuration and a FB-CSI-RS configuration. In case of a FB-CSI-RS, Doppler spread and Doppler shift correspond to large-scale properties capable of assuming QCL only. On the contrary, in case of a DRS-CSI-RS, at least one of delay spread, average gain, average delay, Doppler spread, and Doppler shift may correspond to a large-scale property capable of assuming QCL.

According to one embodiment of the present invention, it may be able to define/configure QCL assumption to be applied to delay spread, Doppler spread, Doppler shift, average gain, and average delay between signals capable of applying QCL (e.g., PSS/SSS/CRS accompanied with a specific PCID) provided to a DRS-CSI-RS configuration and a DRS-CSI-RS. This is because, since a usage of the DRS-CSI-RS is to detect/identify a cell or measure RRM, a more flexible QCL assumption is possible. Hence, in case of the FB-CSI-RS, a strict QCL assumption is applied to frequency synchronization except time synchronization. On the contrary, in case of the DRS-CSI-RS, QCL assumption can also be applied to time synchronization such as average delay and the like.

Mapping Between QCL of DRS-CSI-RS and QCL of FB-CSI-RS

According to one embodiment of the present invention, a base station separately provides information of a signal capable of performing QCL in a DRS-CSI-RS configuration and a FB-CSI-RS configuration to a UE. The base station can additionally provide information on an association relationship or a mapping relationship between the DRS-CSI-RS configuration and the FB-CSI-RS configuration.

Implicit mapping scheme: If a parameter (e.g., a TPID, number of antenna ports, and/or a resource location) included in the DRS-CSI-RS configuration corresponds to (e.g., is matched with) a parameter (e.g., a VCID, number of antenna ports, and/or a resource location) included in the FB-CSI-RS configuration, a UE can recognize it as QCL assumption is available between a DRS-CSI-RS and a FB-CSI-RS.

Explicit mapping scheme: A base station can explicitly signal mapping information indicating a DRS-CSI-RS ID capable of performing QCL assumption with a FB-CSI-RS ID to a UE.

In the implicit mapping scheme and the explicit mapping scheme, the QCL assumption can be applied to at least one or more large-scale properties including delay spread, Doppler spread, Doppler shift, average gain, and average delay of a radio channel. The QCL assumption can also be applied to all of the aforementioned properties. And, when a UE measures a DRS-CSI-RS based on the QCL assumption, the UE may use an estimation value of a large-scale property obtained via the FB-CSI-RS. On the contrary, when the UE measures a FB-CSI-RS based on the QCL assumption, it may be able to restrict the UE to utilize the estimation values of the large-scale property obtained from the DRS-CSI-RS as coarse information only.

As one embodiment of a parameter in the implicit mapping scheme, an embodiment of determining whether or not the number of antenna ports is matched with each other is explained in the following. For example, assume that the number of antenna ports of the FB-CSI-RS configuration and the number of antenna ports of the DRS-CSI-RS configuration correspond to N and M, respectively. If N>=M is satisfied, it may be able to define and configure as an implicit mapping condition for the number of antenna ports is satisfied. In general, a FB-CSI-RS may use many antenna ports to make a CSI feedback on MIMO. On the contrary, a DRS-CSI-RS is used for measuring RRM. In this case, since the DRS-CSI-RS is able to measure RRM with the relatively less number (e.g., 1 or 2) of antenna ports, it is not required to have many antennas as many as the number of antenna ports used for MIMO.

A concrete embodiment for a different implicit mapping is explained in the following. If at least one of conditions described in the following is satisfied, it is able to assume that a FB-CSI-RS is QCLed with a DRS-CSI-RS.

Number of antenna ports N of FB-CSI-RS>=number of antenna ports M of DRS-CSI-RS

Identical scrambling ID

Identical PCID of QCLed CRS/PSS/SSS

Identical frequency/time resource location

If the aforementioned conditions are satisfied, a UE can recognize it as a QCL interworking relationship between a DRS-CSI-RS and a FB-CSI-RS is implicitly indicated. Yet, in case of the identical frequency/time resource location, as shown in Table 5 and 6, it may be able to determine whether or not an RE position is identical to each other based on assumption that a DRS-CSI-RS port and a FB-CSI-RS port are matched with each other.

In general, the number of ports of the DRS-CSI-RS is equal to or less than the number of ports of the FB-CSI-RS. It may be able to define the maximum number (M_max) of antenna ports capable of being allocated to the DRS-CSI-RS. For example, the M_max corresponds to 1 and 2 in Table 5 and 6, respectively.

Table 5 and Table 6 respectively show numbering of a DRS-CSI-RS port and numbering of a FB-CSI-RS port.

TABLE 5

| DRS-CSI-RS Port Index | FB-CSI-RS Port Index |
|---|---|
| 215 | 15 |
| 216 | 16 |
| — | 17 |
| — | 18 |
| — | 19 |
| — | 20 |
| — | 21 |
| — | 22 |

Referring to Table 5, port numbering of the DRS-CSI-RS and port numbering of the FB-CSI-RS are separately defined. Yet, a port 215 and 216 of the DRS-CSI-RS are just an example only, by which the present invention may be non-limited. As shown in Table 5, a different port numbering can be applied to the FB-CSI-RS and the DRS-CSI-RS. Although a different port numbering is applied, for example, the DRS-CSI-RS configuration and the FB-CSI-RS configuration can be configured to be transmitted in an identical TPID and an identical frequency/time resource location. Although a period of the DRS-CSI-RS and a period of the FB-CSI-RS are different from each other, transmission of the DRS-CSI-RS and transmission of the FB CSI-RS can be overlapped with each other in a subframe becoming a common multiple of a period. In this case, a UE can recognize that a DRS-CSI-RS port 215 and 216 are also transmitted in a RE position in which a FB-CSI-RS port 15 and 16 are transmitted and the UE can recognize that a FB-CSI-RS sequence and a DRS-CSI-RS are completely identical to each other. In particular, if transmission of the DRS-CSI-RS and transmission of the FB CSI-RS are overlapped, the DRS-CSI-RS and the FB-CSI-RS are recognized as an identical signal.

Hence, the UE not only performs CSI measurement via a signal received in the RE position in which the FB-CSI-RS port 15 and 16 are transmitted but also performs cell identification for discovery/RRM measurement. Meanwhile, since other FB-CSI-RS ports (e.g., port 17 and 18) are not overlapped with the DRS-CSI-RS port, the UE performs CSI measurement only. If a TPID of the DRS-CSI-RS configuration is different from a VCID of the FB-CSI-RS configuration in the subframe in which transmission of the DRS-CSI-RS and transmission of the FB CSI-RS are overlapped, the UE recognizes that the FB-CSI-RS is different from the DRS-CSI-RS in an RE position corresponding to the antenna ports 15 and 16 and may be able to independently receive/measure the DRS-CSI-RS.

TABLE 6

| DRS-CSI-RS Port Index | FB-CSI-RS Port Index |
|---|---|
| 15 | 15 |
| 16 | 16 |
| — | 17 |
| — | 18 |
| — | 19 |
| — | 20 |
| — | 21 |
| — | 22 |

Referring to Table 6, port numbering of the DRS-CSI-RS and port numbering of the FB-CSI-RS are partially overlapped with each other. Referring to a port 15 and a port 16, it is able to see that the DRS-CSI-RS and the FB-CSI-RS are transmitted via an identical transmission antenna port. If the DRS-CSI-RS and the FB-CSI-RS are configured to be transmitted via an identical TPID and an identical resource, and transmission subframes are overlapped with each other, although the DRS-CSI-RS and the FB-CSI-RS are transmitted with a transmission period different from each other, the UE recognizes that a DRS-CSI-RS sequence and a FB-CSI-RS sequence are identical to each other in an RE position in which the port 15 and the port 16 are transmitted.

Hence, the UE not only performs CSI measurement via a signal received in the RE position in which the ports 15 and 16 are transmitted but also performs cell identification for discovery/RRM measurement. Meanwhile, since other FB-CSI-RS ports (e.g., port 17 and 18) are not overlapped with the DRS-CSI-RS port, the UE performs CSI measurement only in response to the corresponding port.

When mapping information between the DRS-CSI-RS and the FB-CSI-RS is provided and transmission subframes according to the DRS-CSI-RS configuration and the FB-CSI-RS configuration are overlapped, if a condition that a frequency/time resource location is different from each other in each of the configurations or a condition that a TPID is identical to each other is satisfied, the UE can recognize it as the mapping between the DRS-CSI-RS and the FB-CSI-RS is valid. If the condition is not satisfied, it may be able to define/configure the UE to recognize it as an error case, ignore both the DRS-CSI-RS configuration and the FB-CSI-RS configuration, recognize it as the DRS-CSI-RS configuration is valid only, or recognize it as the FB-CSI-RS is valid only.

A FB-CSI-RS and a DRS-CSI-RS based on an identical scrambling ID or an explicitly mapped scrambling ID can satisfy a condition that mapping is valid. Yet, a FB-CSI-RS and a prescribed DRS-CSI-RS (e.g., a DRS-CSI-RS based on a different scrambling ID) can be overlapped with each other although the FB-CSI-RS and the prescribed DRS-CSI-RS do not satisfy the condition that mapping is valid. According to one embodiment, a UE may assume that a DRS-CSI-RS has priority and a FB-CSI-RS is not transmitted in a corresponding RE.

In order to prevent the aforementioned case, the UE may consider two options described in the following.

Option 1: A resource of the DRS-CSI-RS and a resource of the FB-CSI-RS are configured to be overlapped with each other irrespective of whether it is implicitly or explicitly configured. For example, in a configurable FB-CSI-RS resource configuration or a subframe configuration, a partial resource or a subframe can be disabled. If the DRS-CSI-RS is transmitted in every 40 ms and an offset corresponds to 0, an offset of the FB-CSI-RS is not configured by 0 in response to 5 msec, 10 msec, 15 msec, 20 msec, 25 msec, 30 msec, 35 msec, and 40 msec. offset=0 may not be set to all periods. Unlikely, a plurality of resource configurations can be allocated to the DRS-CSI-RS. Yet, it has a demerit in that it is unable to efficiently use a limited resource. According to a different embodiment, if the DRS-CSI-RS configuration and the FB-CSI-RS configuration are overlapped with each other, the UE may place a priority on reception of the DRS-CSI-RS.

Option 2: If an RE of a FB-CSI-RS and an RE of a DRS-CSI-RS are collided with each other, scrambling IDs, orthogonal covering codes, and transmit power of the FB-CSI-RS and the DRS-CSI-RS should be identical to each other and it is able to assume that antenna ports are QCLed. A base station can provide configurations of the two signals to a UE in consideration of the aforementioned constraints. Hence, if the two signals are overlapped with each other, the UE can perform CSI measurement and RRM measurement by receiving a single signal only.

FIG. 15 is a flowchart for a method of transmitting and receiving a discovery signal according to one embodiment of the present invention.

According to the present embodiment, a discovery signal can include at least one of a cell-specific reference signal, a primary synchronization signal, a secondary synchronization signal, and a DRS-CSI-RS. Explanation on contents overlapped with the aforementioned contents is omitted.

Referring to FIG. 15, a UE receives a configuration for a discovery signal from a base station [S1501]. The discovery signal configuration can be received via RRC (radio resource configuration) signaling. The RRC signaling for the discovery signal configuration may correspond to a UE-dedicated signaling, by which the present invention may be non-limited.

The discovery signal configuration can include a first CSI-RS configuration. The first CSI-RS configuration is used for receiving and measuring a first CSI-RS for measuring RRM. The first CSI-RS may correspond to the aforementioned DRS-CSI-RS. The first CSI-RS configuration can include at least one of an ID of the first CSI-RS configuration, a first physical cell ID, a first scrambling ID, first frequency/time resource location information, and a first subframe offset. The ID of the first CSI-RS configuration is used for a usage of identifying each configuration when a plurality of CSI-RS configurations exist in the UE.

The physical cell ID included in the first CSI-RS configuration is used for identifying a CRS/PSS/SSS capable of assuming QCL with the first CSI-RS. For example, when a discovery signal corresponds to the first CSI-RS which is received based on the first CSI-RS configuration, if the first physical cell ID included in the first CSI-RS configuration corresponds to (e.g., is matched with) a physical cell ID of a PSS/SSS/CRS, the UE assumes that the first CSI-RS is quasi co-located (QCLed) with the PSS/SSS/CRS and receives the first CSI-RS or performs RRM measurement on the first CSI-RS.

As mentioned in the foregoing description, a target signal capable of assuming QCL with the first CSI-RS may correspond to a PSS, an SSS and/or a CRS. In other word, a signal assumed to be QCLed with the first CSI-RS may correspond to signals except the first CSI-RS among signals constructing the discovery signal. This is in contrast to a fact that a target signal capable of assuming QCL with a second CSI-RS (e.g., FB-CSI-RS) for measuring CSI is restricted to a CRS. In particular, the UE can assume that the second CSI-RS is QCLed with a PSS or an SSS.

Meanwhile, a category of a large-scale property capable of assuming QCL between the first CSI-RS and the PSS/SSS/CRS can include at least one or more frequency synchronization-related properties and at least one or more time synchronization-related properties. It is able to assume that the first CSI-RS and the PSS/SSS/CRS are QCLed in response to large-scale properties of a radio channel including average delay and Doppler shift. Among the frequency synchronization-related properties, Doppler shift and Doppler spread are included only in a category of large-scale properties capable of assuming QCL with the second CSI-RS (e.g., FB-CSI-RS) and the time synchronization-related property (e.g., average delay) is not included in the category. Hence, the UE is unable to assume QCL on the average delay between the second CSI-RS and the PSS/SSS/CRS.

As mentioned above, a different QCL assumption is applied to the first CSI-RS for measuring RRM and the second CSI-RS for measuring CSI, respectively.

The first scrambling ID included in the first CSI-RS configuration corresponds to a parameter necessary for generating a first CSI-RS sequence and decoding the generated first CSI-RS sequence. Meanwhile, both the first CSI-RS and the second CSI-RS can be generated based on an identical sequence generation function. Yet, if the first scrambling ID and a second scrambling ID used for generating the second CSI-RS are different from each other, the first CSI-RS and the second CSI-RS can be generated based on sequences different from each other.

The first frequency/time resource location included in the first CSI-RS configuration indicates a location of an RE to which the first CSI-RS is mapped in a subframe. The first frequency/time resource location may be different from a second frequency/time resource location used for mapping the second CSI-RS.

The first subframe offset included in the first CSI-RS configuration is used for identifying a subframe in which the first CSI-RS is transmitted. The first subframe offset may correspond to an offset between a subframe to which an SSS signal corresponding to the first physical cell ID is mapped and a subframe to which the first CSI-RS is mapped.

A discovery signal configuration can include information on a reception periodicity of a discovery signal for RRM measurement. The reception periodicity of the discovery signal for RRM measurement can be configured by 40 ms, 80 ms, or 160 ms. On the contrary, a reception periodicity of the second CSI-RS for CSI measurement can be configured by 5 ms, 10 ms, 20 ms, 40 ms, or 80 ms. Since a discovery target signal corresponds to a PSS, an SSS, a CRS and a DRS-CSI-RS and the CRS is transmitted in every subframe, in the aspect of a base station in On state, the base station transmits a discovery signal in every subframe. Yet, since the UE receives and measures the discovery signal according to a configured reception periodicity of the discovery signal only, the UE recognizes that the discovery signal is received with a period of 40, 80 or 160 subframes.

The discovery signal configuration can further include a reception periodicity of a discovery signal and information on an offset from the reception periodicity. For example, when a period corresponds to 40 ms and an offset corresponds to k, a discovery signal is received in a $k^{th}$ subframe of an $n^{th}$ frame and a $k^{th}$ subframe of an $n+4^{th}$ frame.

Meanwhile, the first CSI-RS configuration included in the discovery signal configuration is distinguished from the second CSI-RS configuration for measuring CSI. A first CSI-RS configuration IE (information element) can be independently configured irrespective of a second CSI-RS configuration IE. Yet, it is not mandatory that the discovery signal configuration including the first CSI-RS configuration and the second CSI-RS configuration are transmitted via a separate RRC message. The discovery signal configuration and the second CSI-RS configuration can be transmitted via a single RRC message. For example, the discovery signal configuration and the second CSI-RS configuration can be transmitted at the same time or separately transmitted via an RRC connection setup message or an RRC connection reconfiguration message. This is because both the first CSI-RS and the second CSI-RS correspond to information requiring UE-dedicated RRC signaling. More specifically, the discovery signal configuration can be included in a measurement configuration IE for measuring UE mobility and RRM.

Meanwhile, the first CSI-RS for RRM measurement is not transmitted with zero power (non-zero power) and the second CSI-RS for CSI measurement can be transmitted with zero power.

Meanwhile, the UE performs radio resource management (RRM) measurement on a discovery signal based on the discovery signal configuration [S1505]. The RRM measurement can include at least one of RSRP, RSSI and RSRQ. The aforementioned QCL assumption can be applied to the RRM measurement. The discovery signal can be transmitted from a serving base station of the UE or can be received from a neighboring base station.

The UE transmits a result of the RRM measurement including reference signal received power (RSRP) information on the first CSI-RS to the base station [S1510].

Figure 16:
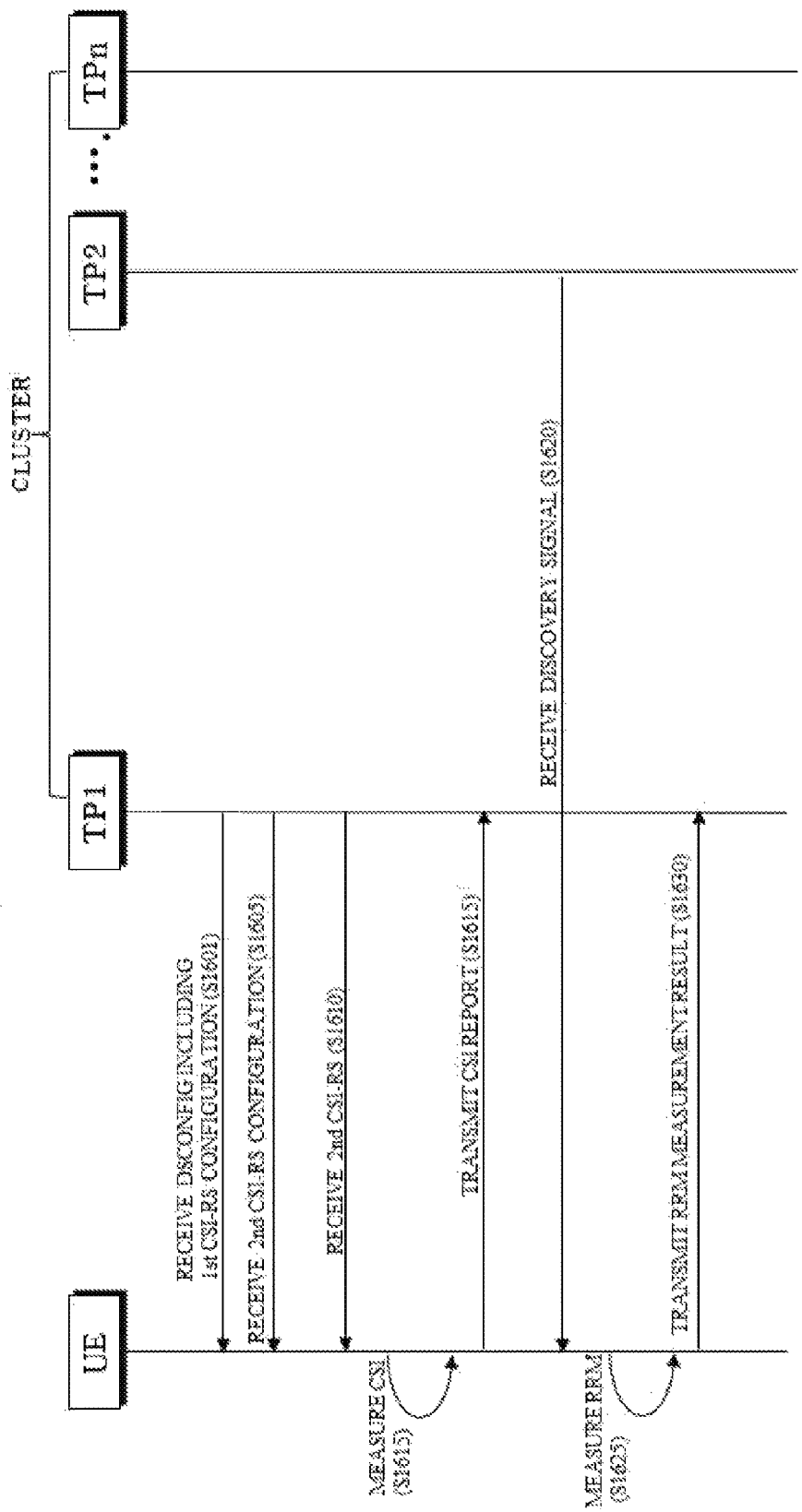
FIG. 16 is a flowchart for a method of transmitting and receiving a discovery signal according to a different embodiment of the present invention.

FIG. 16 is a flowchart for a method of transmitting and receiving a discovery signal according to a different embodiment of the present invention. Explanation on contents overlapped with the aforementioned contents is omitted.

In the present embodiment, assume that a TP 1 to a TP n belong to a TP cluster and TPIDs assigned to each of the TPs are different from each other. The TP 1 corresponds to a serving cell of a UE. TPs can exchange information with each other via a backhaul interface. For example, information necessary for the UE to receive a discovery signal from a TP 2 can be exchanged between the TP 1 and the TP 2 (e.g., at least one of a scrambling ID included in a first CSI-RS configuration, a cell ID, a subframe offset, and a frequency/time resource location).

Referring to FIG. 16, a UE receives a discovery signal configuration including a first CSI-RS configuration from a TP 1 [S1601] and receives a second CSI-RS configuration [S1605].

The UE receives a second CSI-RS from the TP 1 based on the second CSI-RS configuration [S1610]. An order of receiving a first CSI-RS and a second CSI-RS may change depending on an embodiment. Yet, a transmission period of the second CSI-RS is configured to be less than a transmission period of the first CSI-RS in general.

The UE measures CSI based on the second CSI-RS [S1615]. For example, the UE measures at least one of a precoding matrix index (PMI), an rank indicator (RI), and channel quality indicator (CQI) based on the second CSI-RS.

The UE transmits a CSI report based on the second CSI-RS to the TP 1 [S1615].

The UE receives a discovery signal from the TP 2 based on the discovery signal configuration [S1620]. A discovery signal may correspond to a PSS/SSS/CRS. Yet, for clarity, assume that the discovery signal corresponds to the aforementioned first CSI-RS.

The UE performs RRM measurement based on the first CSI-RS [S1625].

The UE transmits a result of the RRM measurement measured on the first CSI-RS to the TP 1 [S1630]. The TP 1 can manage a radio resource and mobility of the UE using the result of the RRM measurement.

Figure 17:
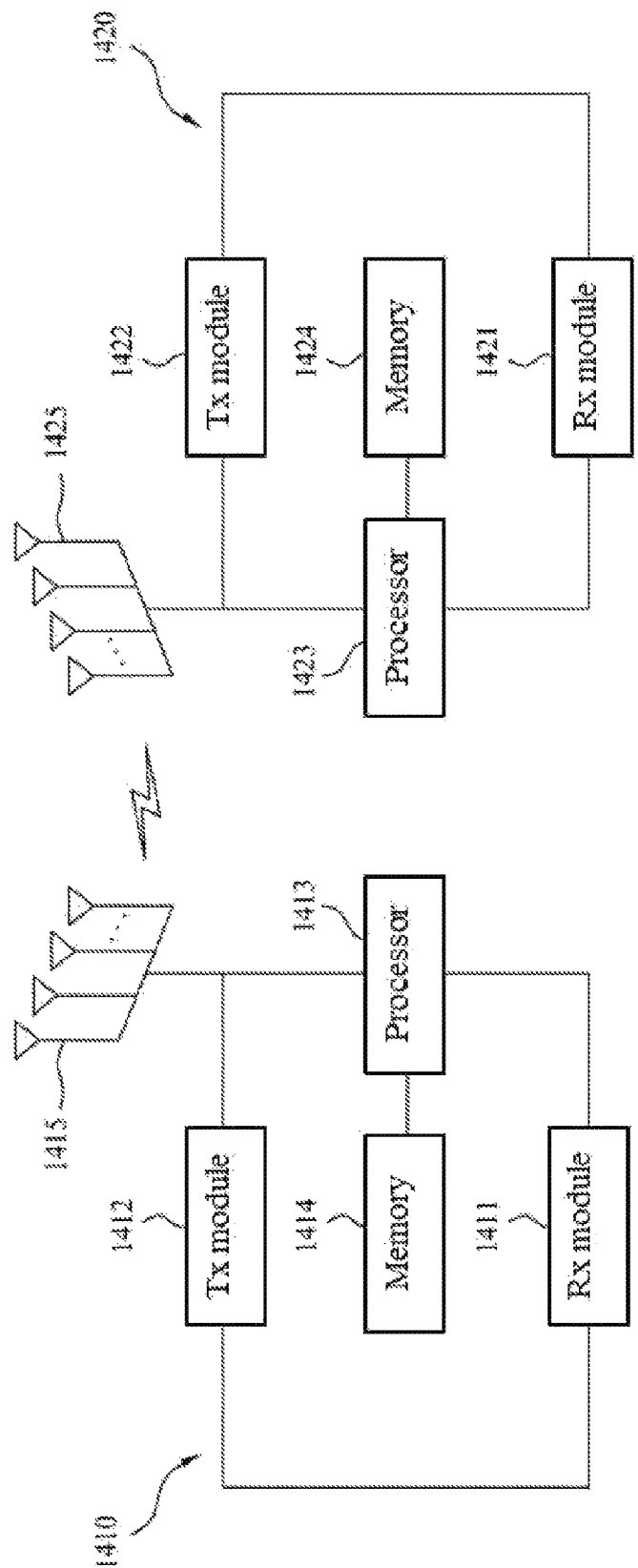
FIG. 17 is a diagram for a user equipment and a base station according to one embodiment of the present invention.

FIG. 17 is a diagram for a user equipment and a base station according to one embodiment of the present invention. The user equipment and the base station shown in FIG. 17 can perform operations of the UE and the base station (or the TP) mentioned earlier in the embodiments of the present invention. A base station (BS) 1410 can include a reception module 1411, a transmission module 1412, a processor 1413, a memory 1414 and a plurality of antennas 1415. A plurality of the antennas 1415 correspond to a base station supporting MIMO transmission and reception. The reception module 1411 can receive various signals, data and information from the user equipment in UL. The transmission module 1412 can transmit various signals, data and information to the user equipment in DL. The processor 1413 can control overall operation of the base station 1410.

Besides, the processor 1413 of the base station performs a function of calculating and processing information received by the base station, information to be transmitted to the external and the like. The memory 1414 can store processed information for prescribed time and can be replaced with such a configuration element as a buffer (not depicted).

A user equipment 1420 can include a reception module 1421, a transmission module 1422, a processor 1423, a memory 1424 and a plurality of antennas 1425. A plurality of the antennas 1425 correspond to a UE supporting MIMO transmission and reception. The reception module 1421 can receive various signals, data and information from the base station in DL. The transmission module 1422 can transmit various signals, data and information to the base station in UL. The processor 1423 can control overall operation of the user equipment 1420.

Besides, the processor 1423 of the user equipment 1420 performs a function of calculating and processing information received by the user equipment 1420, information to be transmitted to the external and the like. The memory 1424 can store processed information for prescribed time and can be replaced with such a configuration element as a buffer (not depicted).

The reception module 1421 of the user equipment 1420 according to one embodiment of the present invention receives a discovery signal configuration including a first channel state information-reference signal (CSI-RS) configuration from the base station. The processor 1423 performs radio resource management (RRM) on a discovery signal based on the discovery signal configuration. If the discovery signal corresponds to a first CSI-RS, which is received based on the first CSI-RS configuration, and a first cell ID included in the first CSI-RS configuration corresponds to a second signal different from the first CSI-RS, the processor 1423 assumes that the first CSI-RS and the second signal are QCL (quasi co-located).

The processor 1413 of the base station 1410 according to one embodiment of the present invention generates a discovery signal configuration including a first channel state information-reference signal (CSI-RS). The transmission module 1412 transmits the discovery signal configuration to the UE. The reception module 1411 receives radio resource management (RRM) information on a discovery signal, which is measured based on the discovery signal configuration, from the UE. Meanwhile, if the discovery signal corresponds to a first CSI-RS, which is received based on the first CSI-RS configuration, and a first cell ID included in the first CSI-RS configuration corresponds to a second signal different from the first CSI-RS, it is assumed that the first CSI-RS and the second signal are QCL (quasi co-located).

For a concrete configuration of the user equipment and the base station, items mentioned earlier in various embodiments of the present invention can be independently applied or two or more embodiments can be applied at the same time. For clarity, explanation on contents overlapped with the aforementioned contents is omitted.

And, in explaining FIG. 17, if a relay becomes a downlink transmission entity from a base station or an uplink reception entity to the base station, or the relay becomes a downlink reception entity from the UE or an uplink transmission entity to the UE, the principle of the present invention can also be identically applied to the relay via various embodiments of the present invention.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

A specific operation described as performed by a base station may be performed by an upper node of the base station. Namely, it is apparent that, in a network comprised of a plurality of network nodes including a base station, various operations performed for communication with a UE may be performed by the base station, or network nodes other than the base station. The term 'base station' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting and receiving a discovery signal in a wireless communication system and an apparatus therefor are explained centering on examples applied to 3GPP LTE system, the method and the apparatus can also be applied to various wireless communication systems as well as 3GPP LTE system.

What is claimed is:

1. A method of receiving a discovery signal by a user equipment in a wireless communication system, comprising:
receiving a discovery signal configuration containing a first channel state information-reference signal (CSI-RS) configuration from a base station;
receiving a second CSI-RS configuration for CSI measurement from the base station;
receiving a second CSI-RS based on the second CSI-RS configuration;
reporting CSI containing at least one of a precoding matrix index (PMI), a rank indicator (RI), and a channel quality indicator (CQI) based on the second CSI-RS;
performing radio resource management (RRM) measurement on the discovery signal based on the discovery signal configuration; and
transmitting a result of the RRM measurement containing reference signal received power (RSRP) information on the discovery signal to the base station,
wherein the first CSI-RS configuration contained in the discovery signal configuration is configured separately with respect to the second CSI-RS configuration,
wherein if the discovery signal corresponds to a first CSI-RS, which is received based on the first CSI-RS configuration, and a first cell ID corresponds to a cell-specific reference signal, the first CSI-RS and the cell-specific reference signal are assumed to be quasi co-located (QCLed), and
wherein at least one of radio channel properties assumed to be QCLed between the first CSI-RS for the RRM measurement and the cell-specific reference signal is different from radio channel properties assumed to be QCLed between the second CSI-RS for CSI measurement and the cell-specific reference signal.

2. The method of claim 1,
wherein the first CSI-RS and the cell-specific reference signal are assumed to be QCLed with respect to a time synchronization-related property and a frequency synchronization-related property and
wherein the second CSI-RS and the cell-specific reference signal are assumed to be QCLed with respect to the frequency synchronization-related property.

3. The method of claim 1,
wherein the first CSI-RS and the cell-specific reference signal are assumed to be QCLed with respect to large-scale properties of a radio channel containing average delay and Doppler shift and
wherein the second CSI-RS and the cell-specific reference signal are not assumed to be QCLed with respect to average delay.

4. The method of claim 1, wherein if a primary synchronization signal and a secondary synchronization signal correspond to the first cell ID, the primary synchronization signal and the secondary synchronization signal are assumed to be QCLed with the first CSI-RS and the primary synchronization signal and the secondary synchronization signal are not assumed to be QCLed with the second CSI-RS.

5. The method of claim 1,
wherein the discovery signal comprises at least one of the cell-specific reference signal, a primary synchronization signal, a secondary synchronization signal, and the first CSI-RS based on the first CSI-RS configuration and
wherein the first CSI-RS is assumed to be QCLed with the rest of signals except the first CSI-RS among the discovery signal.

6. The method of claim 1,
wherein a reception periodicity of the discovery signal for the RRM measurement is configured by 40 ms, 80 ms or 160 ms and
wherein a reception periodicity of the second CSI-RS is configured by 5 ms, 10 ms, 20 ms, 40 ms or 80 ms.

7. The method of claim 1, wherein the first CSI-RS for the RRM measurement is transmitted by non-zero power and wherein the second CSI-RS is transmitted by zero power.

8. The method of claim 1, wherein the first CSI-RS is received from a neighboring cell or a neighboring transmission point.

9. The method of claim 1, wherein if the first CSI-RS and the second CSI-RS are received via an identical resource in an identical subframe, both of the RRM measurement based on the first CSI-RS and the CSI measurement based on the second CSI-RS are performed.

10. The method of claim 1, wherein if the first CSI-RS and the second CSI-RS are received via an identical resource in an identical subframe, the RRM measurement is performed based on QCL assumption between the second CSI-RS and the cell-specific reference signal instead of QCL assumption between the first CSI-RS and the cell-specific reference signal.

11. The method of claim 1, wherein if the first CSI-RS and the second CSI-RS are received via an identical resource in an identical subframe, the first CSI-RS is assumed to be QCLed with the second CSI-RS.

12. The method of claim 1, wherein the first CSI-RS and the second CSI-RS are assumed to be QCLed when the number of antenna ports of the first CSI-RS is equal to or less than the number of antenna ports of the second CSI-RS and a scrambling ID of the first CSI-RS and a scrambling ID of the second CSI-RS are identical to each other.

13. A user equipment receiving a discovery signal in a wireless communication system, comprising:
   a receiver to receive a discovery signal configuration containing a first channel state information-reference signal (CSI-RS) configuration from a base station, to receive a second CSI-RS configuration for CSI measurement from the base station and to receive a second CSI-RS based on the second CSI-RS configuration;
   a processor to perform radio resource management (RRM) measurement on the discovery signal based on the discovery signal configuration; and
   a transmitter to transmit CSI containing at least one of a precoding matrix index (PMI), a rank indicator (RI), and a channel quality indicator (CQI) based on the second CSI-RS, and to transmit a result of the RRM measurement containing reference signal received power (RSRP) information on the discovery signal to the base station,
   wherein the first CSI-RS configuration contained in the discovery signal configuration is configured separately with respect to the second CSI-RS configuration,
   wherein if the discovery signal corresponds to a first CSI-RS, which is received based on the first CSI-RS configuration, and a first cell ID corresponds to a cell-specific reference signal, the first CSI-RS and the cell-specific reference signal are assumed to be quasi co-located (QCLed) and
   wherein at least one of radio channel properties assumed to be QCLed between the first CSI-RS for the RRM measurement and the cell-specific reference signal is different from radio channel properties assumed to be QCLed between the second CSI-RS for CSI measurement and the cell-specific reference signal.

14. A method of configuring a discovery signal by a base station in a wireless communication system, comprising:
   transmitting, to a user equipment, a discovery signal configuration containing a first channel state information-reference signal (CSI-RS) configuration;
   transmitting, to the user equipment, a second CSI-RS configuration for CSI measurement;
   transmitting, to the user equipment, a second CSI-RS based on the second CSI-RS configuration;
   receiving, from the user equipment, CSI containing at least one of a precoding matrix index (PMI), a rank indicator (RI), and a channel quality indicator (CQI) based on the second CSI-RS;
   receiving, from the user equipment, radio resource management (RRM) information on the discovery signal, which is measured based on the discovery signal configuration,
   wherein the first CSI-RS configuration contained in the discovery signal configuration is configured separately with respect to the second CSI-RS configuration,
   wherein if the discovery signal corresponds to a first CSI-RS according to the first CSI-RS configuration and a first cell ID contained in the first CSI-RS configuration corresponds to a cell-specific reference signal, the first CSI-RS and the cell-specific reference signal are assumed to be quasi co-located (QCLed) and
   wherein at least one of radio channel properties assumed to be QCLed between the first CSI-RS for the RRM measurement and the cell-specific reference signal is different from radio channel properties assumed to be QCLed between the second CSI-RS for CSI measurement and the cell-specific reference signal.

* * * * *